United States Patent
Vroom et al.

(10) Patent No.: US 10,459,486 B2
(45) Date of Patent: Oct. 29, 2019

(54) MOTORIZED HORIZONTAL DOCKING STATION HAVING INTEGRATED LOCKING MECHANISM

(71) Applicant: Henge Docks LLC, Arlington, VA (US)

(72) Inventors: Matthew Leigh Vroom, San Francisco, CA (US); Benjamin Edwards Maskell, Arlington, VA (US)

(73) Assignee: Brydge Technologies LLC, Park City, UT (US)

( * ) Notice: Subject to any disclaimer, the term of this patent is extended or adjusted under 35 U.S.C. 154(b) by 980 days.

(21) Appl. No.: 14/584,031

(22) Filed: Dec. 29, 2014

(65) Prior Publication Data

US 2015/0185709 A1    Jul. 2, 2015

Related U.S. Application Data

(60) Provisional application No. 61/922,094, filed on Dec. 31, 2013, provisional application No. 61/988,250, filed on May 4, 2014.

(51) Int. Cl.
| | |
|---|---|
| *H02P 3/00* | (2006.01) |
| *G06F 1/16* | (2006.01) |
| *G05B 9/02* | (2006.01) |
| *G07C 9/00* | (2006.01) |
| *E05B 73/00* | (2006.01) |
| *F16B 2/06* | (2006.01) |
| *F16H 35/10* | (2006.01) |
| *G06F 21/31* | (2013.01) |
| *G06F 21/86* | (2013.01) |
| *G06F 21/88* | (2013.01) |
| *G06F 13/42* | (2006.01) |

(52) U.S. Cl.
CPC ........ *G06F 1/1632* (2013.01); *E05B 73/0082* (2013.01); *F16B 2/065* (2013.01); *F16H 35/10* (2013.01); *G05B 9/02* (2013.01); *G06F 13/4282* (2013.01); *G06F 21/31* (2013.01); *G06F 21/86* (2013.01); *G06F 21/88* (2013.01); *G07C 9/00174* (2013.01); *F16H 2035/106* (2013.01); *G06F 2213/0024* (2013.01); *Y10T 74/18808* (2015.01); *Y10T 74/2066* (2015.01)

(58) Field of Classification Search
CPC ......... G05B 9/02; G06F 1/1632; G06F 21/31; F16H 35/10
USPC ....................................................... 318/476
See application file for complete search history.

(56) References Cited

U.S. PATENT DOCUMENTS

| | | |
|---|---|---|
| 253,129 A | 1/1882 | Teese |
| 290,366 A | 12/1883 | Snyder et al. |
| 3,727,171 A | 4/1973 | Coles et al. |

(Continued)

*Primary Examiner* — Eduardo Colon Santana
*Assistant Examiner* — Gabriel Agared
(74) *Attorney, Agent, or Firm* — Maskell Law PLLC; Benjamin E. Maskell

(57) ABSTRACT

Disclosed is a method for detecting misalignment between a plurality of plugs in a motorized docking station and a corresponding plurality of ports on an electronic device, the method including applying an electrical charge to a motor, the motor connected to a drive train and the drive train connected to the plurality of plugs, monitoring an electrical property of the electrical charge, and removing the electrical charge from the motor if the electrical property exceeds a predetermined threshold.

17 Claims, 30 Drawing Sheets

(56) References Cited

U.S. PATENT DOCUMENTS

| | | |
|---|---|---|
| 3,775,733 A | 11/1973 | Ege |
| 3,781,766 A | 12/1973 | Teagno et al. |
| 3,816,821 A | 6/1974 | Rhodes |
| 3,873,172 A | 3/1975 | Paullus |
| 4,097,113 A | 6/1978 | McKelvy |
| 4,178,060 A | 12/1979 | Coffey |
| 4,387,951 A | 6/1983 | Hall et al. |
| 4,418,975 A | 12/1983 | O'Keefe, II |
| 4,490,002 A | 12/1984 | Fowler |
| 4,659,166 A | 4/1987 | Morningstar et al. |
| 4,726,789 A | 2/1988 | Yaffe |
| 4,762,388 A | 8/1988 | Tanaka et al. |
| 4,836,804 A | 6/1989 | London et al. |
| 4,842,363 A | 6/1989 | Margolin et al. |
| 4,870,702 A | 9/1989 | Azzouni |
| 4,881,910 A | 11/1989 | Odemer |
| 4,899,591 A | 2/1990 | Kibblewhite |
| 5,030,128 A | 7/1991 | Herron et al. |
| 5,092,788 A | 3/1992 | Pristupa, Jr. et al. |
| 5,137,455 A | 8/1992 | Moerbe et al. |
| 5,186,646 A | 2/1993 | Pederson |
| 5,225,825 A | 7/1993 | Warren |
| 5,283,714 A | 2/1994 | Tsai |
| 5,411,416 A | 5/1995 | Balon et al. |
| 5,460,547 A | 10/1995 | Belt et al. |
| 5,569,052 A | 10/1996 | Belt et al. |
| 5,679,026 A | 10/1997 | Fain et al. |
| 5,683,261 A | 11/1997 | Ahles et al. |
| 5,725,397 A | 3/1998 | Fukamachi et al. |
| 5,729,478 A | 3/1998 | Ma et al. |
| 5,738,537 A | 4/1998 | Setoguchi et al. |
| 5,805,412 A | 9/1998 | Yanagisawa et al. |
| 5,825,617 A | 10/1998 | Kochis |
| 5,933,321 A * | 8/1999 | Ruch ..................... G06F 1/1632 361/679.42 |
| 5,997,323 A | 12/1999 | Youn |
| 6,045,410 A | 4/2000 | Norizuki et al. |
| 6,046,571 A | 4/2000 | Bovio et al. |
| 6,061,233 A | 5/2000 | Jung |
| 6,061,234 A | 5/2000 | Broder |
| 6,119,237 A | 9/2000 | Cho |
| 6,151,218 A | 11/2000 | Pirdy et al. |
| 6,175,926 B1 | 1/2001 | Fogle |
| 6,206,578 B1 | 3/2001 | Shin et al. |
| 6,236,571 B1 | 5/2001 | Dohi |
| 6,280,212 B1 | 8/2001 | Nguyen |
| 6,309,230 B2 | 10/2001 | Helot |
| 6,312,295 B2 | 11/2001 | Nishimatsu |
| 6,321,340 B1 | 11/2001 | Shin et al. |
| 6,343,957 B1 | 2/2002 | Kuo et al. |
| 6,352,447 B1 | 3/2002 | Ruth |
| 6,411,503 B1 | 6/2002 | Kambayashi et al. |
| 6,424,524 B2 | 7/2002 | Bovio et al. |
| 6,524,140 B2 | 2/2003 | Takagi et al. |
| 6,533,599 B1 | 3/2003 | Singleton, Jr. |
| 6,558,201 B1 | 5/2003 | Begley et al. |
| 6,583,985 B2 | 6/2003 | Nguyen |
| 6,594,146 B2 | 7/2003 | Frangesch |
| 6,663,439 B2 | 12/2003 | Henry et al. |
| 6,666,715 B2 | 12/2003 | Fujita et al. |
| 6,667,881 B2 | 12/2003 | Oross |
| 6,697,892 B1 | 2/2004 | Laity et al. |
| 6,724,615 B2 | 4/2004 | Kambayashi et al. |
| 6,767,253 B1 | 7/2004 | Werner et al. |
| 6,796,844 B1 | 9/2004 | Edwards, III |
| 6,814,626 B2 | 11/2004 | Wen-Yao |
| 6,833,988 B2 | 12/2004 | Kamphuis |
| 6,878,016 B2 | 4/2005 | Wulff et al. |
| 6,912,125 B2 | 6/2005 | Weng |
| 6,934,788 B2 | 8/2005 | Laity et al. |
| 6,943,527 B2 | 9/2005 | Liu et al. |
| 7,017,243 B2 | 3/2006 | Carnevali |
| 7,077,709 B1 | 7/2006 | Shin-Ting |
| 7,081,025 B2 | 7/2006 | Zhang et al. |
| 7,094,112 B2 | 8/2006 | Arai et al. |
| 7,110,252 B2 | 9/2006 | Liang |
| 7,144,278 B2 | 12/2006 | Le Gallic et al. |
| 7,184,266 B1 | 2/2007 | Chen |
| 7,247,032 B2 | 7/2007 | Merz |
| 7,320,614 B2 | 1/2008 | Toda et al. |
| 7,417,855 B2 | 8/2008 | Carnevali |
| 7,503,808 B2 | 3/2009 | O'Shea |
| 7,508,661 B2 | 3/2009 | Carnevali |
| 7,551,458 B2 | 6/2009 | Carnevali |
| 7,554,819 B2 | 6/2009 | Chen et al. |
| 7,563,140 B1 | 7/2009 | Wan et al. |
| 7,601,024 B2 | 10/2009 | Martich |
| 7,690,944 B2 | 4/2010 | Matsumura et al. |
| 7,857,664 B2 | 12/2010 | Waryck et al. |
| 7,914,348 B1 | 3/2011 | Lin |
| 7,924,559 B2 | 4/2011 | Kuo |
| 7,942,705 B2 | 5/2011 | Murphy et al. |
| 7,978,466 B2 | 7/2011 | Lewandowski |
| 8,079,880 B2 | 12/2011 | Lin et al. |
| 8,105,108 B2 | 1/2012 | Vroom et al. |
| 8,212,145 B2 | 7/2012 | Nagai et al. |
| 8,272,903 B2 | 9/2012 | Lin |
| 8,353,730 B1 | 1/2013 | Wang et al. |
| 8,373,984 B2 | 2/2013 | Lin |
| 8,419,479 B2 | 4/2013 | Vroom et al. |
| 8,512,079 B2 | 8/2013 | Vroom et al. |
| 8,512,080 B2 | 8/2013 | Vroom et al. |
| 8,568,160 B2 | 10/2013 | Coggins et al. |
| 8,585,443 B1 | 11/2013 | Vroom et al. |
| 8,699,211 B2 | 4/2014 | Kao |
| 8,867,202 B2 | 10/2014 | Williams |
| 2001/0012718 A1 | 8/2001 | Nishimatsu |
| 2001/0012734 A1 | 8/2001 | Nishimatsu |
| 2002/0037669 A1 | 3/2002 | D'Addario |
| 2002/0123271 A1 | 9/2002 | Henry et al. |
| 2003/0095395 A1 | 5/2003 | Clark et al. |
| 2003/0220001 A1 | 11/2003 | Milan |
| 2003/0231465 A1 | 12/2003 | Weng |
| 2004/0053538 A1 | 3/2004 | Villain |
| 2004/0077225 A1 | 4/2004 | Chun-Fu |
| 2004/0115994 A1 | 6/2004 | Wulff et al. |
| 2004/0120112 A1 | 6/2004 | Mullen et al. |
| 2005/0026510 A1 | 2/2005 | Orihara |
| 2005/0064765 A1 | 3/2005 | Simpson et al. |
| 2005/0070170 A1 | 3/2005 | Zhang et al. |
| 2005/0112940 A1 | 5/2005 | Naganishi |
| 2005/0128687 A1 | 6/2005 | Liang |
| 2005/0168937 A1 | 8/2005 | Yin et al. |
| 2005/0266720 A1 | 12/2005 | Lin |
| 2005/0286219 A1 | 12/2005 | Kim |
| 2006/0061964 A1 | 3/2006 | Cheng |
| 2006/0079136 A1 | 4/2006 | Wei |
| 2006/0085584 A1 | 4/2006 | Chen et al. |
| 2006/0139875 A1 | 6/2006 | Cheng et al. |
| 2006/0148328 A1 | 7/2006 | Le Gallic |
| 2006/0171112 A1 | 8/2006 | Lev et al. |
| 2006/0250767 A1 | 11/2006 | Brophy et al. |
| 2007/0014080 A1 | 1/2007 | McCormack |
| 2007/0022582 A1 | 2/2007 | Carnevali |
| 2007/0070598 A1 | 3/2007 | Chuang |
| 2007/0177347 A1 | 8/2007 | Nishiyama |
| 2007/0224889 A1 | 9/2007 | Ito |
| 2007/0232152 A1 | 10/2007 | Hong |
| 2007/0258206 A1 | 11/2007 | Huang |
| 2008/0270664 A1 | 10/2008 | Carnevali |
| 2009/0016015 A1 | 1/2009 | Seibert et al. |
| 2009/0023347 A1 | 1/2009 | Hou et al. |
| 2009/0158423 A1 | 6/2009 | Orlassino et al. |
| 2009/0212189 A1 | 8/2009 | Carnevali |
| 2010/0073862 A1 | 3/2010 | Carnevali |
| 2010/0158297 A1 | 6/2010 | Stuczynski |
| 2010/0195279 A1 | 8/2010 | Michael |
| 2010/0197173 A1 | 8/2010 | Tsunoda et al. |
| 2010/0243398 A1 | 9/2010 | Nagami |
| 2010/0265652 A1 | 10/2010 | Agata et al. |
| 2010/0309622 A1 | 12/2010 | Zimmermann |
| 2011/0065314 A1 | 3/2011 | Vroom et al. |
| 2011/0103003 A1 | 5/2011 | Ward et al. |
| 2011/0134601 A1 | 6/2011 | Sa |

(56) References Cited

U.S. PATENT DOCUMENTS

| | | |
|---|---|---|
| 2011/0242754 A1 | 10/2011 | Morton |
| 2011/0273838 A1 | 11/2011 | Lin |
| 2011/0279966 A1 | 11/2011 | Sayavong |
| 2011/0318944 A1 | 12/2011 | Lin et al. |
| 2012/0127651 A1 | 5/2012 | Kwon et al. |
| 2012/0162902 A1 | 6/2012 | Zhou et al. |
| 2012/0212900 A1 | 8/2012 | Hung |
| 2012/0212910 A1 | 8/2012 | Katsuta |
| 2013/0107446 A1 | 5/2013 | Carnevali |
| 2013/0137297 A1 | 5/2013 | Vroom |
| 2013/0148289 A1 | 6/2013 | Kwon |
| 2013/0277520 A1 | 10/2013 | Funk |
| 2014/0015493 A1* | 1/2014 | Wirz .................. H02J 50/90 320/137 |
| 2014/0038450 A1 | 2/2014 | Vroom et al. |
| 2014/0094058 A1 | 4/2014 | Vroom |
| 2014/0328020 A1 | 11/2014 | Galant |

* cited by examiner

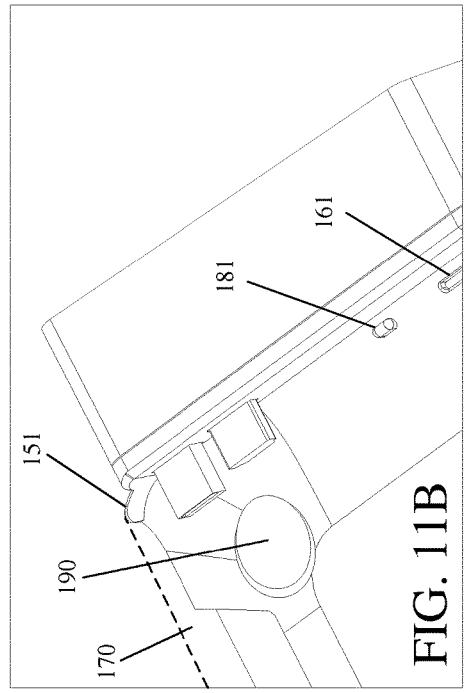
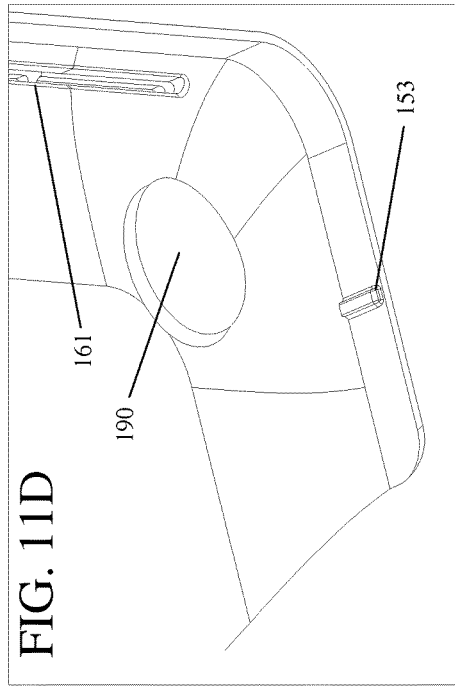
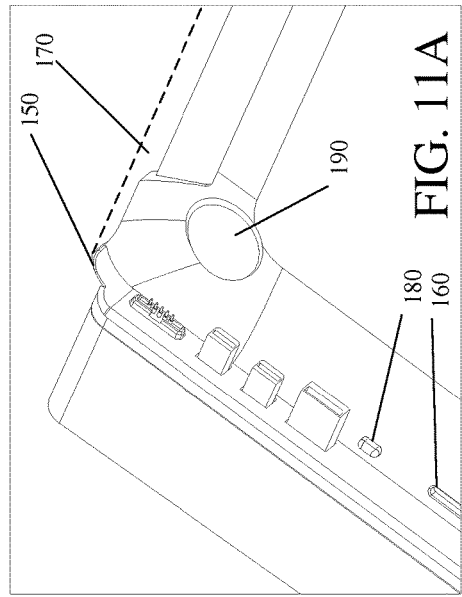
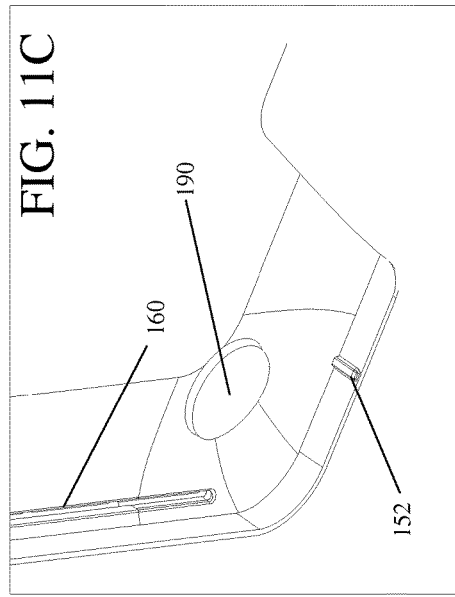

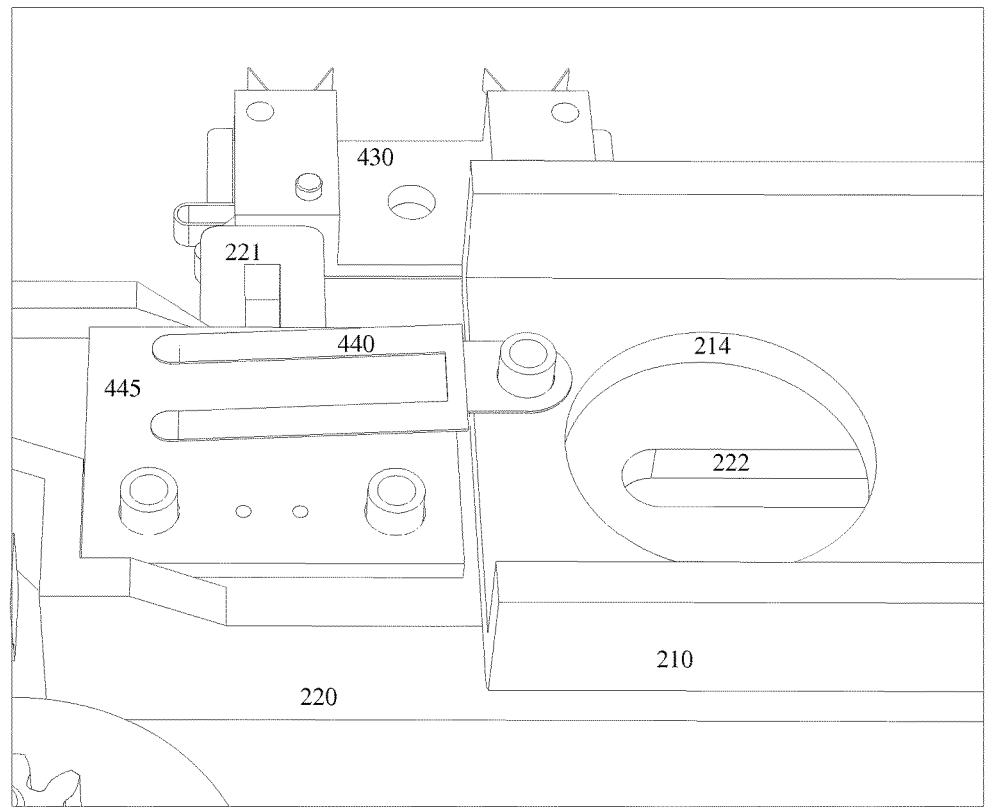
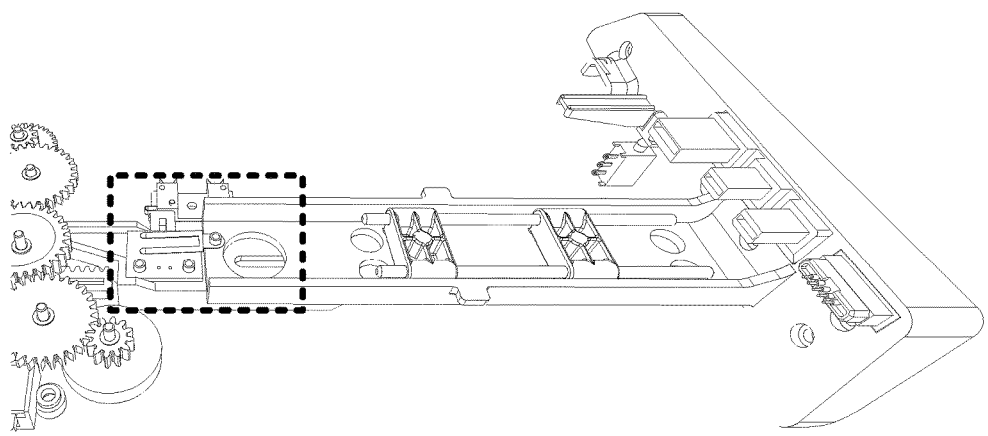
FIG. 12

MOTORIZED HORIZONTAL DOCKING STATION HAVING INTEGRATED LOCKING MECHANISM

This application is a non-provisional of, and claims the benefit of priority to, U.S. Provisional Application 61/922,094 filed Dec. 31, 2013 and U.S. Provisional Application 61/988,250 filed May 4, 2014. The entirety of the aforementioned provisional applications are hereby incorporated by reference.

BACKGROUND OF THE INVENTION

Field of the Invention

The embodiments of the invention relate a docking station for an electronic device, and more particularly, to a software controlled, horizontally oriented docking station for a laptop computer. Although embodiments of the invention are suitable for a wide scope of applications, it is particularly suitable for use with laptop computers that have ports on two opposing sides and for protecting an electronic device from unauthorized removal from a docking station.

Discussion of the Related Art

The related art docking stations include docking stations for laptop computers. Docking stations of the related art are generally of the form disclosed in U.S. Pat. No. 6,309,230 to Helot, particularly FIG. 1 and FIG. 2. The related art docking stations generally interface with an electronic device such as a laptop computer. The electrical connection between electronic device and docking station is generally achieved through a single, multi-pin docking port. The related art docking station generally provides a multitude of additional interface ports connected to the docking port.

Docking stations of the related art also include multi-plug to multi-port docking stations such as disclosed in U.S. Pat. Pub. 2013/0148289 of Kitae Kwon ("Kwon"), particularly in FIG. 2 (multi-plug), and FIG. 6 (multi-port). See also U.S. Pat. Pub. 2012/0127651 of Kitae Kwon, et. al. Kwon discloses, generally, a plurality of plugs on a sliding arm that can be activated by a lever. When the lever is activated, the arms squeeze together and engage the plurality of plugs with the corresponding ports of an electronic device. Kwon also discloses using a Kensington-style lock to bind the sliding arm to the chassis and prevent movement sliding arm.

The related art docking stations also include opposing connector blocks. To connect a computer to the related art docking stations, a user positions the electronic device within the docking station, and activates a lever to cause the opposing connector blocks to press into the electronic device thereby making an electrical connection between the docking station and the electronic device. In the related art, the opposing connector blocks can be connected to the lever through a hinge or a cam. Both the hinge and cam are described in U.S. Pat. Pub. 2013/0148289 of Kitae Kwon, particularly in FIG. 1A, FIG. 1B (cam), and FIG. 4 (hinge). See also U.S. Pat. Pub. 2012/0127651 of Kitae Kwon, et. al.

There are some disadvantages of the related art systems. For example, the related art docking stations rely on a lever to so that a user can manually actuate the connector blocks. The lever is generally offset from the axis of the connector blocks the lever can be accessible by a user. An offset lever creates a non-linear force on the connector block and can cause misalignment of the connector block and prevent the connector block from interfacing with the docked device as designed. The lever also has the disadvantage that it must be moved to effectuate docking and undocking. The lever can be challenging to manipulate on a crowded desk or by a person having limited dexterity.

The related art docking stations are also generally passive—the dock does not have awareness of whether an electronic device is present or if the connectors of the connector blocks are inserted into the docked device. A passive docking station cannot, for example, detect whether the electronic device is properly positioned within the dock.

The related art docking stations also have a predetermined range of motion for the connector blocks. This range of motion is determined by the length of the lever arms and hinges or the size of the cam. Mechanical devices, however, tend to wear with extended use. As the related art begins to wear, the range of motion for the connector blocks can become sloppy or loose. Because docking requires high tolerances, a loose connector block could cause misalignment or incomplete insertion.

The related art of Helot, requires that the electronic device includes a docking connector. Thus the docking station of Helot cannot be used with electronic devices that do not include a docking connector. Helot is also limited in that Helot does not provide a mechanism to secure either the electronic device or the docking station. While Kwon teaches using multiple plugs instead of a docking connector and using a Kensington-style lock to secure the electronic device and docking station, Kwon does not allow removal of the electronic device without also manually removing the Kensington-style lock.

Laptop computers generally include an integrated audio device to allow audio output to integrated speakers or a headphone jack. However, most laptop computers include a hardware switch in a headphone jack that automatically disables the internal speakers of a laptop computer when a plug is inserted into the headphones jack. In most commercially available laptop computers the hardware switch in the headphones jack cannot be overridden by software such that if a plug is inserted in the headphones jack, playback through the internal speakers of the laptop computer is impossible.

SUMMARY OF THE INVENTION

Accordingly, embodiments of the invention are directed to a motorized horizontal docking station having integrated locking mechanism that substantially obviates one or more of the problems due to limitations and disadvantages of the related art.

An object of embodiments of the invention is to provide a docking station having high-tolerance connections between the connector blocks and the docking actuator.

Another object of embodiments of the invention is to provide a docking station that can detect whether an electronic device is properly positioned before the docking connectors are inserted.

Yet another object of embodiments of the invention is to provide a docking station having physical features that aid in the proper alignment of the electronic device.

Still another object of embodiments of the invention is to provide a docking station that protects an electronic device from physical damage due to misalignment within the docking station.

An object of embodiments of the invention is to provide a docking station that easily docks and undocks the electronic device.

Another object of embodiments of the invention is to provide a docking station is to provide security features to retain the electronic device within the docking station.

Yet another object of embodiments of the invention is to provide a docking station with an emergency override of the security feature.

An object of embodiments of the invention is to provide a docking station for an electronic device that does not have a docking port.

Another object of embodiments of the invention is to provide independent locking mechanisms for each of the docking station and electronic device.

Yet another object of embodiments of the invention is to provide multiple audio devices and a selector to choose an audio device.

Still another object of embodiments of the invention is to provide enterprise security features to docking stations.

Additional features and advantages of embodiments of the invention will be set forth in the description which follows, and in part will be apparent from the description, or may be learned by practice of embodiments of the invention. The objectives and other advantages of the embodiments of the invention will be realized and attained by the structure particularly pointed out in the written description and claims hereof as well as the appended drawings.

To achieve these and other advantages and in accordance with the purpose of embodiments of the invention, as embodied and broadly described, the motorized horizontal docking station having integrated locking mechanism includes a top surface of the housing for receiving an electronic device, a plurality of positioning members of the top surface for positioning the electronic device with respect to the top surface, a first sensor for detecting the presence of the electronic device, a first connector block, a first connector of the first connector block, a first arm of the first connector block, a motor connected to the first arm via one or more gears, and a security hole for attaching a lock.

Specific embodiments of the invention include a first slot on a right edge of the top surface and a second slot on a left edge of the top surface. In other embodiments, the plurality of positioning members includes four positioning members. The first positioning member can be disposed on the top surface to contact a front surface of the electronic device. The second positioning member can be disposed on the top surface to contact a front surface of the electronic device. The third positioning member can be disposed on the top surface to contact a rear surface and a first side surface of the electronic device. The fourth positioning member can be disposed on the top surface to contact a rear surface and a second side surface of the electronic device.

Some embodiments include a second sensor for detecting the presence of the electronic device. In some embodiments, the first connector block further includes a second connector. In some embodiments, the first arm is formed from a block-side portion and a follower portion. The two portions can be connected by a linear clutch. A sensor can be associated with the linear clutch to detect a slippage of the linear clutch.

The arm portion can include a sliding member that slides on rails connected to the housing. The docking station can further include an alignment arm associated with the first connector block.

The arm can include a rack gear that is driven by a pinion gear. The docking station can further include an emergency override gear connected to the pinion gear and a clutch gear. The clutch gear can be configured to slip in response to a rotational force applied to the emergency override gear. The clutch-gear can be disposed between the motor and the pinion gear. The docking station can include a sensor in the security hole. The docking station can include a position sensor for detecting the position of the first arm and a position reference member associated with the first arm that is positioned to interface with the position sensor.

In another aspect, the motorized horizontal docking station having integrated locking mechanism includes a housing, a tray of the housing for receiving an electronic device, a first sensor for detecting the presence of the electronic device, a first connector block, a first connector of the first connector block, the first connector positioned to engage a first port of the electronic device, a first arm of the first connector block, the first arm slidably connected to the housing, a second connector block opposite the first connector block, a second connector of the second connector block, the second connector positioned to engage a second port of the electronic device, a second arm of the second connector block, the second arm slidably connected to the housing, and a motor connected to the first arm and the second arm via one or more gears, the motor operable to turn the one or more gears thereby sliding the first and second arms to engage and disengage the first and second connectors with the first and second ports of the electronic device, respectively.

In yet another embodiment, the motorized horizontal docking station having integrated locking mechanism includes a housing, a tray of the housing for receiving an electronic device, a connector block, a connector of the connector block, the connector positioned to engage a port of the electronic device, an arm of the connector block, the arm slidably connected to the housing, a block-side portion of the arm, a follower portion of the arm; and a linear clutch connecting the block-side portion to the follower portion, the linear clutch operable to slip thereby allowing the follower portion to move independently of the block-side portion. The docking station can further include a first sensor for detecting the presence of the electronic device and a second sensor associated with the linear clutch, the second sensor configured to detect a slippage of the linear clutch.

In another aspect, a motorized horizontal docking station having integrated locking mechanism includes a method for preventing unauthorized removal of an electronic device from a docking station including inserting a first plug into a first port of the electronic device, inserting a second plug into a second port of the electronic device, setting the docking station to a locked state, preventing removal of the first plug from the first port while the docking station is in the locked state, setting the docking station to an unlocked state, removing the first plug from the first port, and removing the second plug from the second port.

In another aspect, the motorized horizontal docking station having integrated locking mechanism includes a method for preventing unauthorized removal of an electronic device from a docking station including receiving a lock message at the docking station, setting the docking station to a locked state, disabling undocking while the docking station is in the locked state, receiving an unlock message at the docking station, setting the docking station to an unlocked state, and enabling undocking while the docking station is in the unlocked state.

In yet another aspect, the motorized horizontal docking station having integrated locking mechanism includes a method for preventing unauthorized removal of an electronic device from a docking station including determining whether the electronic device is docked in the docking station, sending a "lock" message from the electronic device to the docking station, receiving a "request authorization" message from the docking station, authorizing unlocking of the docking station, and sending an "unlock" message from the electronic device to the docking station.

In still another aspect, the motorized horizontal docking station having integrated locking mechanism includes a system for preventing unauthorized removal of an electronic device from a docking station including a first plug positioned to slidably interface with a first port of the electronic device, a second plug opposite the first plug and positioned to slidably interface with a second port of the electronic device, a mechanical locking mechanism operable to restrict removal of the first and second plugs from the electronic device, and a software application for communicating with the docking station, the software application including a messaging component for sending messages to, and receiving messages from, the docking station, and an authorization component for authorizing unlocking of the locking mechanism.

In another aspect, the motorized horizontal docking station having integrated locking mechanism includes a system for managing a computer having a variable set of attached peripherals, the system including an audio output selector, an audio input selector, a window position control module, a profile selection module for determining a device profile, and an undocking component for dismounting a data storage device.

In yet another aspect, the motorized horizontal docking station having integrated locking mechanism includes a method for removing an electronic device from a docking station including receiving an "undock" message, sending a "confirmation" message to the electronic device, dismounting data storage devices, and removing a first plug of the docking station from a first port of the electronic device.

In still another aspect, the motorized horizontal docking station having integrated locking mechanism includes a system for attaching a plurality of external connectors to an electronic device including a docking station, a first plug on the docking station positioned to interface with a first port on the electronic device, a second plug on the docking station positioned to interface with a second port on the electronic device, a first audio device in the docking station, a second audio device in the docking station, a selector to selectively enable one of the first audio device and second audio device.

In another aspect, the motorized horizontal docking station having integrated locking mechanism includes a sliding arm having a connector block with a plurality of plugs. The sliding arm includes a block-side portion and a follower portion. The block-side portion can have a first end connected to the connector block. The follower portion can be connected to a second end of the block-side portion with a linear clutch. The linear clutch can include a bolt, a spring, and two sliding members. The bolt can pass through the block-side portion and the follower portion. A force on an end of the arm can cause the clutch to slip allowing the follower portion to move independently of the block-side portion. A sensor can detect a slippage of the linear clutch.

In yet another aspect, the motorized horizontal docking station having integrated locking mechanism includes a tray for receiving the electronic device, the tray having a top surface, a bottom surface, and a plurality of sidewalls, a plurality of positioning members of the top surface of the tray for positioning the electronic device with respect to the top surface, a first rail fixed to the bottom surface of the tray; and a first sliding member slidably connected to the first rail. In some aspects, the docking station can further include a second rail and a second sliding member slidably connected thereto. The docking station can also include recesses sized to receive the feet of the electronic device.

In still another aspect, the motorized horizontal docking station having integrated locking mechanism includes a tray for receiving the electronic device, the tray having a top surface, a bottom surface, and a plurality of sidewalls, a plurality of positioning members of the top surface of the tray for positioning the electronic device with respect to the top surface, a first rail fixed to the bottom surface of the tray, a second rail fixed to the bottom surface of the tray and parallel to the first rail, a first sliding member slidably connected to the first rail and the second rail, a third rail fixed to the bottom surface of the tray, a fourth rail fixed to the bottom surface of the tray and parallel to the third rail, and a second sliding member slidably connected to the third rail and the fourth rail.

In another aspect, the motorized horizontal docking station having integrated locking mechanism includes a tray for receiving the electronic device, the tray having a top surface, a bottom surface, and a plurality of sidewalls, a plurality of positioning members of the top surface of the tray for positioning the electronic device with respect to the top surface, a first rail fixed to the bottom surface of the tray, a first sliding member slidably connected to the first rail, a second sliding member slidably connected to the first rail, a second rail fixed to the bottom surface of the tray, a third sliding member slidably connected to the second rail, and a fourth sliding member slidably connected to the second rail.

In still another aspect, a horizontal docking station having integrated locking mechanism includes a first connector block slidably connected to a first side of the docking station, a second connector block opposite the first connector block and slidably connected to a second side of the docking station, a first plug of the first connector block positioned to interface with a first port of the electronic device, a first port on the docking station electrically connected to the first plug, a first dummy plug of the second connector block positioned to interface with a second port of the electronic device, and a security hole for receiving a lock.

In yet another aspect, a horizontal docking station having integrated locking mechanism includes a first connector block slidably connected to a first side of the docking station, a first arm connected to the first connector block, a first plug of the first connector block positioned to interface with a first port of the electronic device, a second plug of the first connector block positioned to interface with a second port of the electronic device, a first port on the docking station electrically connected to the first plug, a second port on the docking station electrically connected to the second plug, a second connector block opposite the first connector block and slidably connected to a second side of the docking station, a second arm connected to the second connector block, a third plug of the second connector block positioned to interface with a third port of the electronic device, the third plug formed from an insulating material, a fourth plug of the second connector block positioned to interface with a fourth port of the electronic device, the fourth plug formed from an insulating material, and a security hole dimensioned to receive a Kensington-style lock.

In another aspect, a horizontal docking station having integrated locking mechanism includes a first connector block fixed to a first side of the docking station, a second connector block opposite the first connector block and slidably connected to a second side of the docking station, a first plug of the first connector block positioned to interface with a first port of the electronic device, a first port on the docking station electrically connected to the first plug, a second plug formed from an insulating material on the second connector block, the second plug positioned to interface with a second port of the electronic device, and a security hole for receiving a lock.

In still another aspect, a horizontal docking station having integrated locking mechanism includes a method for detecting misalignment between a plurality of plugs in a motorized docking station and a corresponding plurality of ports on an electronic device, including applying an electrical charge to a motor, the motor connected to a drive train and the drive train connected to the plurality of plugs, monitoring an electrical property of the electrical charge, and removing the electrical charge from the motor if the electrical property exceeds a predetermined threshold.

In yet another aspect, a horizontal docking station having integrated locking mechanism includes a device for detecting misalignment between a plurality of plugs in a motorized docking station and a corresponding plurality of ports on an electronic device, the device including a motor connected to a drive train and the plurality of plugs, a sensor configured to detect an electrical property of an electrical charge applied to the motor; and a processor configured to remove the electrical charge from the motor when the electrical property exceeds a predetermined threshold.

In another aspect, a horizontal docking station having integrated locking mechanism includes a device for detecting misalignment between a plurality of plugs in a motorized docking station and a corresponding plurality of ports on an electronic device, the device including a motor connected to a drive train and the plurality of plugs, a sensor configured to detect an current of an electrical charge applied to the motor, and a processor configured to remove the electrical charge from the motor when the current exceeds a predetermined absolute threshold current, wherein the processor is further configured to apply a reverse electrical charge to the motor when the electrical property exceeds the predetermined threshold.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the invention and are incorporated in and constitute a part of this specification, illustrate embodiments of the invention and together with the description serve to explain the principles of embodiments of the invention.

FIG. 11A is a detailed perspective view of a top surface of the docking station for an electronic device;

FIG. 11B is a detailed perspective view of a top surface of the docking station for an electronic device;

FIG. 11C is a detailed perspective view of a top surface of the docking station for an electronic device;

FIG. 11D is a detailed perspective view of a top surface of the docking station for an electronic device;

FIG. 12 is a detailed perspective view of an arm of a connector block actuator with a linear clutch removed;

DETAILED DESCRIPTION OF THE PREFERRED EMBODIMENTS

Figure 1:
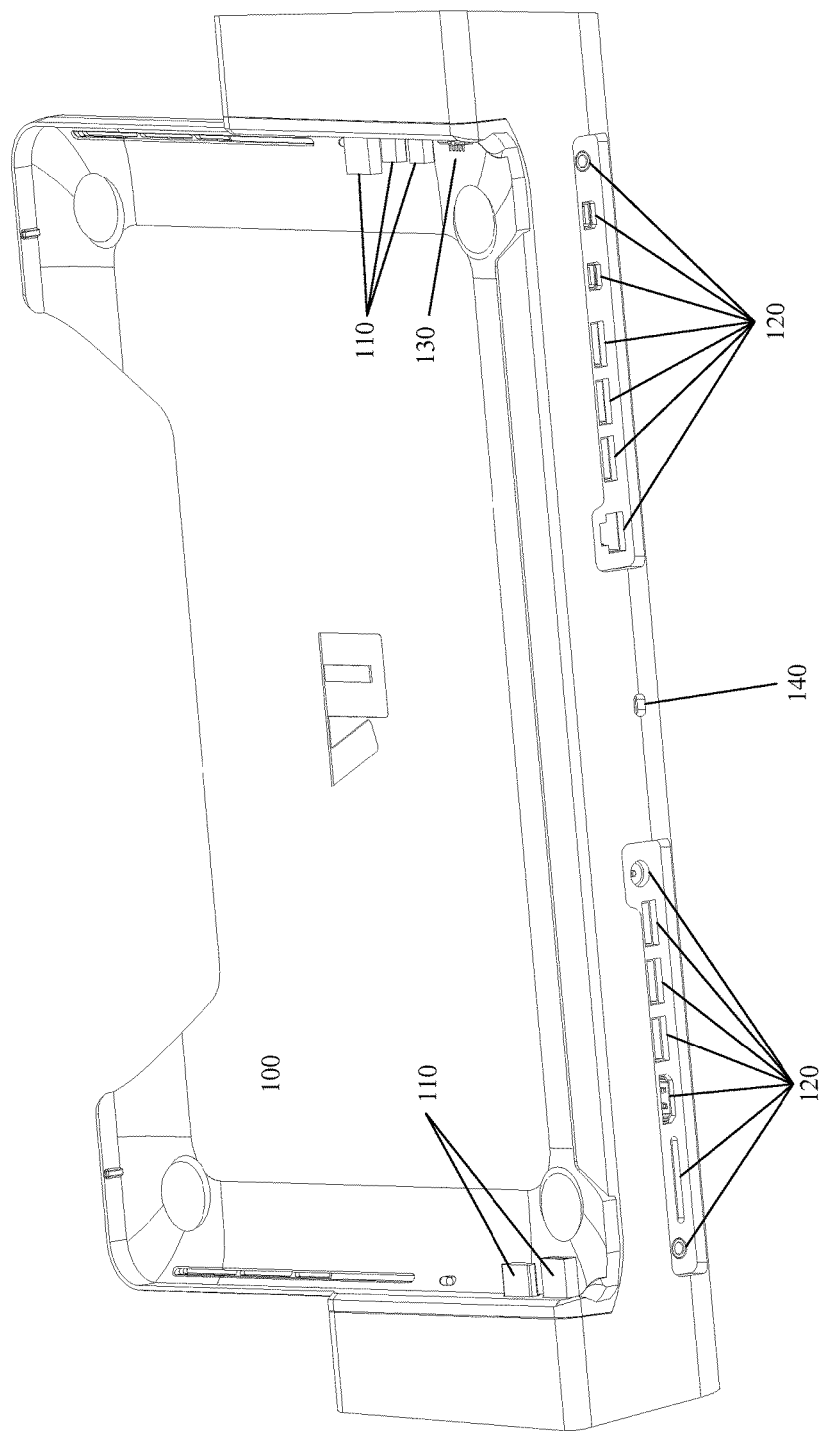
FIG. 1 is perspective view of a docking station for an electronic device.

Reference will now be made in detail to the preferred embodiments of the invention, examples of which are illustrated in the accompanying drawings. The invention may, however, be embodied in many different forms and should not be construed as being limited to the embodiments set forth herein; rather, these embodiments are provided so that this disclosure will be thorough and complete, and will fully convey the concept of the invention to those skilled in the art. In the drawings, the thicknesses of layers and regions are exaggerated for clarity. Like reference numerals in the drawings denote like elements.

FIG. 1 is perspective view of a docking station for an electronic device. As shown in FIG. 1, the docking station has a tray 100, a plurality of connectors 110, a plurality of ports 120, a plurality of pins 130, and a security hole 140. The tray 100 is formed to compliment the size and shape of the electronic device. The tray can hold the electronic device in position to interface with the plurality of connectors 110. The plurality of connectors 110 can be positioned to match the location of corresponding ports of an electronic device.

The plurality of connectors 110 can be electronically connected to the plurality of ports 120. The electronic connections can be pass-through meaning that each of the plurality of connectors 110 corresponds to one of the plurality of ports 120 and that the electrical signals between the connectors and ports are not altered by the docking station. The electronic connections can be active meaning that one or more of the plurality of connectors 110 can be electrically connected to circuitry and subsequently connected to one or more of the plurality of ports 120. For example, one of the plurality of connectors 110 can be a USB connector electronically connected to a USB hub which is in turn electronically connected to more than one of the plurality of ports 120.

The plurality of pins 130 can be the pins described in U.S. Pat. No. 8,512,080 to Vroom et. al, the entirety of which is hereby incorporated by reference. The security hole 140 can be sized to accommodate a Kensington style lock.

Figure 2:
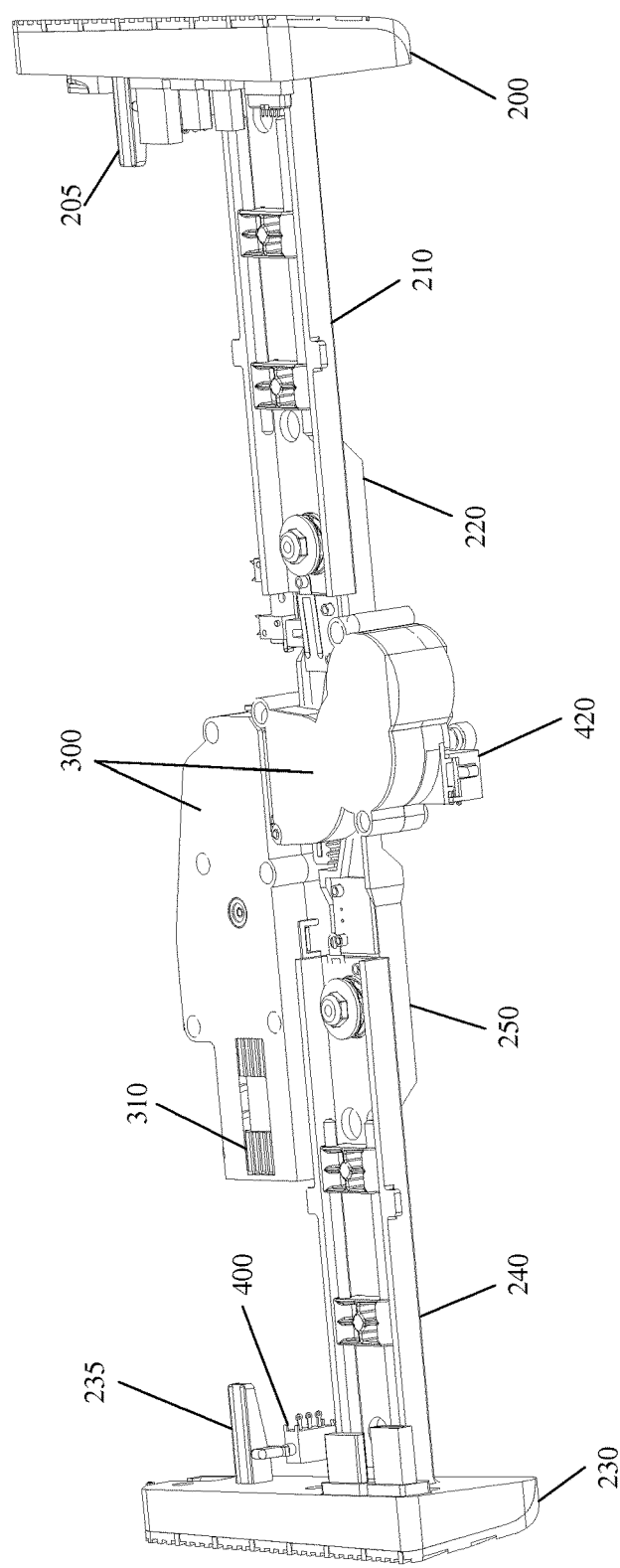
FIG. 2 is a perspective view of connector block actuator of a docking station for an electronic device.

FIG. 2 is a perspective view of connector block actuator of a docking station for an electronic device. As shown in FIG. 2 the connector block actuator includes connector blocks 200 and 230 and gear box 300. The connector block 200 is has a block-side arm portion 210, a follower arm portion 220, and an alignment arm 205. The connector block 230 is has a block-side arm portion 240, a follower arm portion 250, and an alignment arm 235. The gearbox 300 includes a motor 310. The docking station includes sensor 400 for detecting when an electronic device is properly inserted into the docking station. The docking station can have a symmetrical sensor (not shown) on the opposite side near connector block 200. The docking station can include a sensor 420 for detecting when a lock is inserted in the security hole 140 of FIG. 1.

Figure 3:
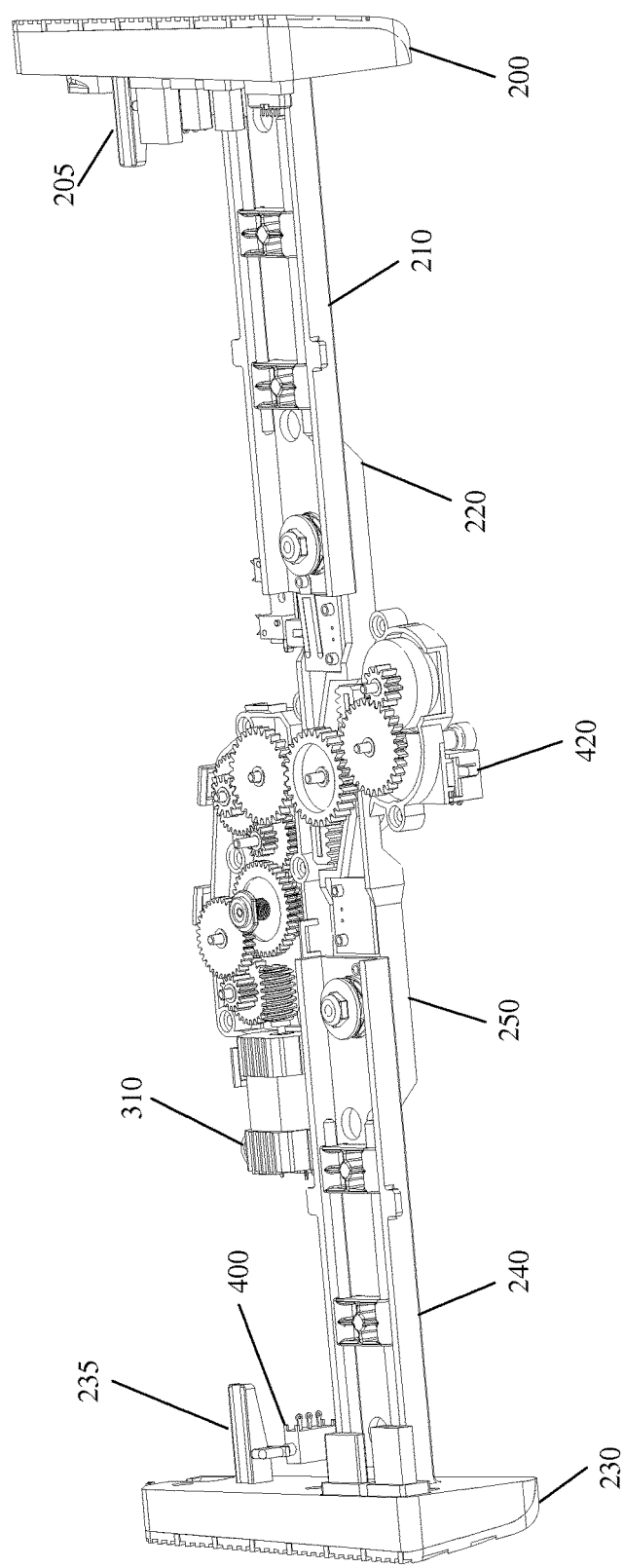
FIG. 3 is a perspective view of connector block actuator of a docking station for an electronic device.

FIG. 3 is a perspective view of connector block actuator of a docking station for an electronic device. As shown in FIG. 3 the connector block actuator includes connector blocks 200 and 230. The connector block 200 is has a block-side arm portion 210, a follower arm portion 220, and an alignment arm 205. The connector block 230 is has a block-side arm portion 240, a follower arm portion 250, and an alignment arm 235. The connector block actuator includes a motor 310. The docking station includes sensor 400 for detecting when an electronic device is properly inserted into the docking station. The docking station can have a symmetrical sensor (not shown) on the opposite side near connector block 200. The docking station can include a sensor 420 for detecting when a lock is inserted in the security hole 140 of FIG. 1.

In operation, the motor 310 can turn the gears (not labeled) and cause the follow arm portions 220 and 250 to slide or traverse inwards and outwards. The follow arm portions 220 and 250 are connected to the block-side arm portions 210 and 240 (respectively) which are in turn connected to the connector blocks 200 and 230 (respectively). When an electronic device (not shown) is positioned in the docking station, the motor 310 can be activated to cause the connector blocks 200 and 230 to slide inwards thereby causing the plurality of connectors (not labeled) to be pressed into the electronic device. The motor 310 can be operated in a reverse direction causing the connector blocks 200 and 230 to slide outwards thereby causing the plurality of connectors (not labeled) to be removed from the electronic device.

When the connector blocks 200 and 230 are in an inward, "closed", or "docked" position, the electronic device is securely retained in the docking station to prevent theft of the electronic device. The docking station can be locked to a stationary object by inserting a Kensington-style lock into the security hole 140 of FIG. 1. In this way, an electronic device that is docked in the docking station is secured to the docking station, and the docking station is locked to the stationary object thereby preventing theft of either the docking station or the docked electronic device. The sensor 420 can detect the presence of a lock in the security hole 140 of FIG. 1 and optionally disable opening of the connector blocks 200 and 230. The electronic device can interface with the docking station to determine the status of the sensor 420 and enable/disable docking through software. If the lock is removed from the security hole 140, the docking station can allow normal docking/undocking without software.

The sensor 420 can also act as a reset switch. For example, when the sensor 420 is activated five times in rapid succession, the docking station can interpret that signal as a reset signal and cause the connector blocks 200 and 230 to move outwards into an "open" or "undocked" position. The presence of a lock in the security hole 140 can block the sensor 420 thereby preventing unauthorized resetting of the docking station and removal of the electronic device.

Figure 4:
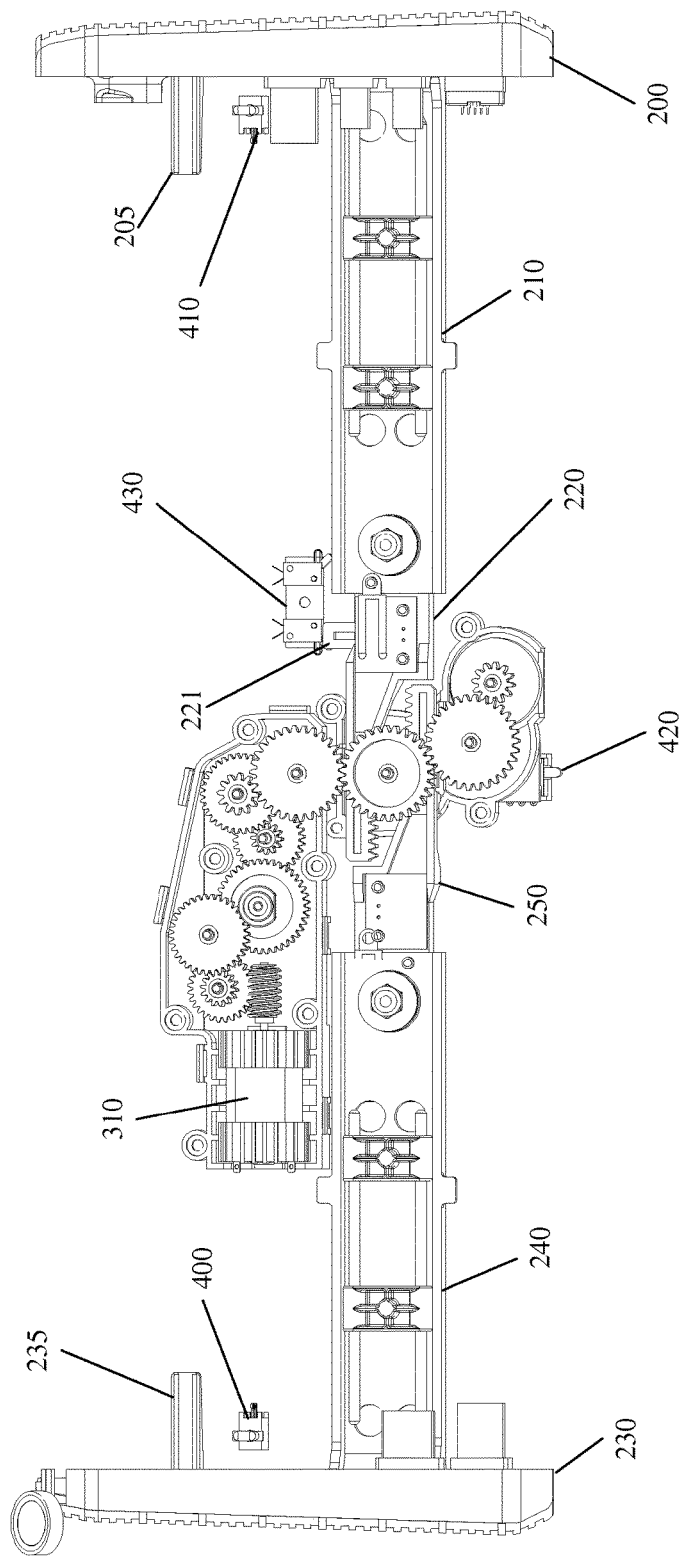
FIG. 4 is a top view of connector block actuator of a docking station for an electronic device.

FIG. 4 is a top view of connector block actuator of a docking station for an electronic device. As shown in FIG. 4 the connector block actuator includes connector blocks 200 and 230. The connector block 200 is has a block-side arm portion 210, a follower arm portion 220, and an alignment arm 205. The connector block 230 is has a block-side arm portion 240, a follower arm portion 250, and an alignment arm 235. The connector block actuator includes a motor 310. The docking station includes sensor 400 for detecting when an electronic device is properly inserted into the docking station. The docking station can have a symmetrical sensor 410 on the opposite side near connector block 200. The docking station can include a sensor 420 for detecting when a lock is inserted in the security hole 140 of FIG. 1.

The docking station can include a sensor 430 for detecting the position of the connector block 200 or 230. The sensor 430 can detect the position of a tab 221 or other movable feature and thereby infer the position of the connector block 200 or 230. In the exemplary embodiment of FIG. 4, a closed position can be indicated when the tab 221 is on the left edge of the sensor 430. In the exemplary embodiment of FIG. 4, an open position can be indicated when the tab 221 is on the right edge of the sensor 430.

Figure 5:
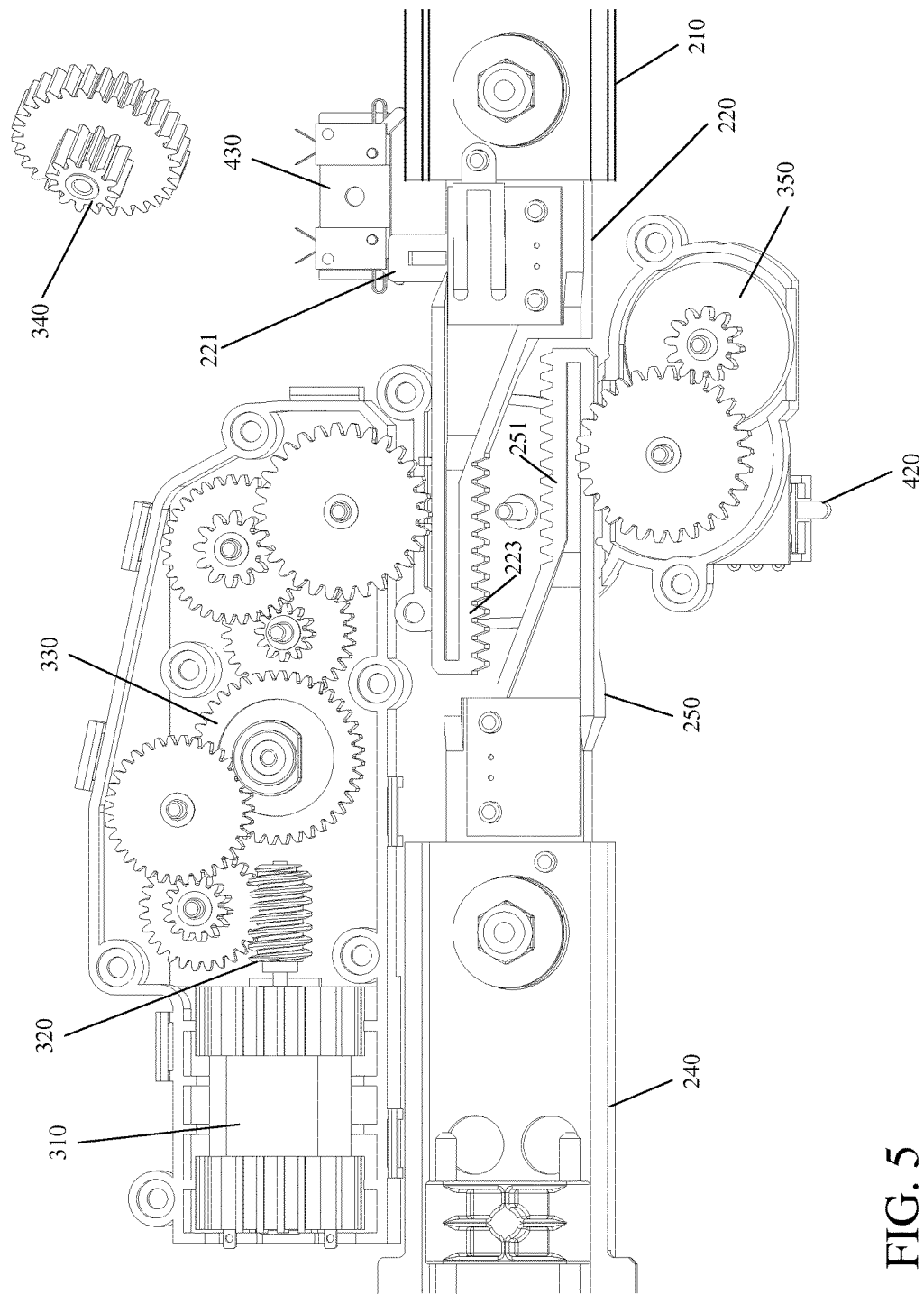
FIG. 5 is a detailed top view of connector block actuator of a docking station for an electronic device.

FIG. 5 is a detailed top view of connector block actuator of a docking station for an electronic device. As shown in FIG. 5 the connector block actuator includes a block-side arm portion 210, a follower arm portion 220, a block-side arm portion 240, and a follower arm portion 250. The docking station can include a sensor 420 for detecting when a lock is inserted in the security hole 140 of FIG. 1. The follower arm portion 220 includes a rack-gear portion 223. The follower arm portion 250 includes a rack-gear portion 251.

The connector block actuator can include a motor 310, a worm-gear 320, a clutch-gear 330, a pinion-gear 340, and an emergency override gear 350. In FIG. 5, the pinion-gear 340 has been moved and shown in perspective for clarity. The clutch-gear 330 has a slipping feature so that if the connector blocks or other moving parts become jammed or their movement is otherwise impeded that the motor 310 will not burn out or destroy the other gears.

The clutch-gear 330 also works in conjunction with the emergency override gear 350. In the event of a power failure and an electronic device is in the docking station with the connector blocks in the closed position, the emergency override gear 350 can be manually manipulated with an allen key or like tool. Those of skill in the art will appreciate it is difficult to drive a worm-gear in reverse. The clutch-gear 330 allows the other gears to turn in response to a manual rotation of the emergency override gear 350 so that the connector blocks and arms can be positioned in the open position. The clutch-gear 330 in this instance slips so that the other gears may turn.

When rotated, the pinion-gear 340 causes the rack-gears 221 and 251 to move laterally and, consequently, move the connector blocks inwards or outwards.

Figure 6:
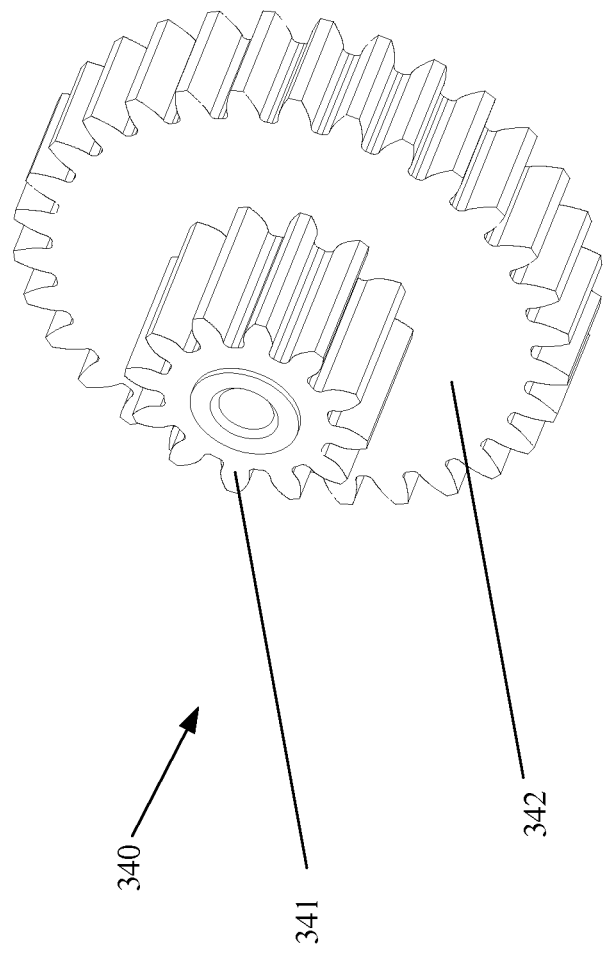
FIG. 6 is a perspective view of a pinion-gear.

FIG. 6 is a perspective view of a pinion-gear. The pinion-gear 340 includes a smaller portion 341 and a larger portion 342. The smaller portion 341 drives the rack-gears 221 and 251 of FIG. 5. The larger portion 342 is driven by the motor via the other gears in the gearbox. A rotation of the larger portion 342 causes the smaller portion 341 to rotate and move the rack-gears.

Figures 7A, 7B:
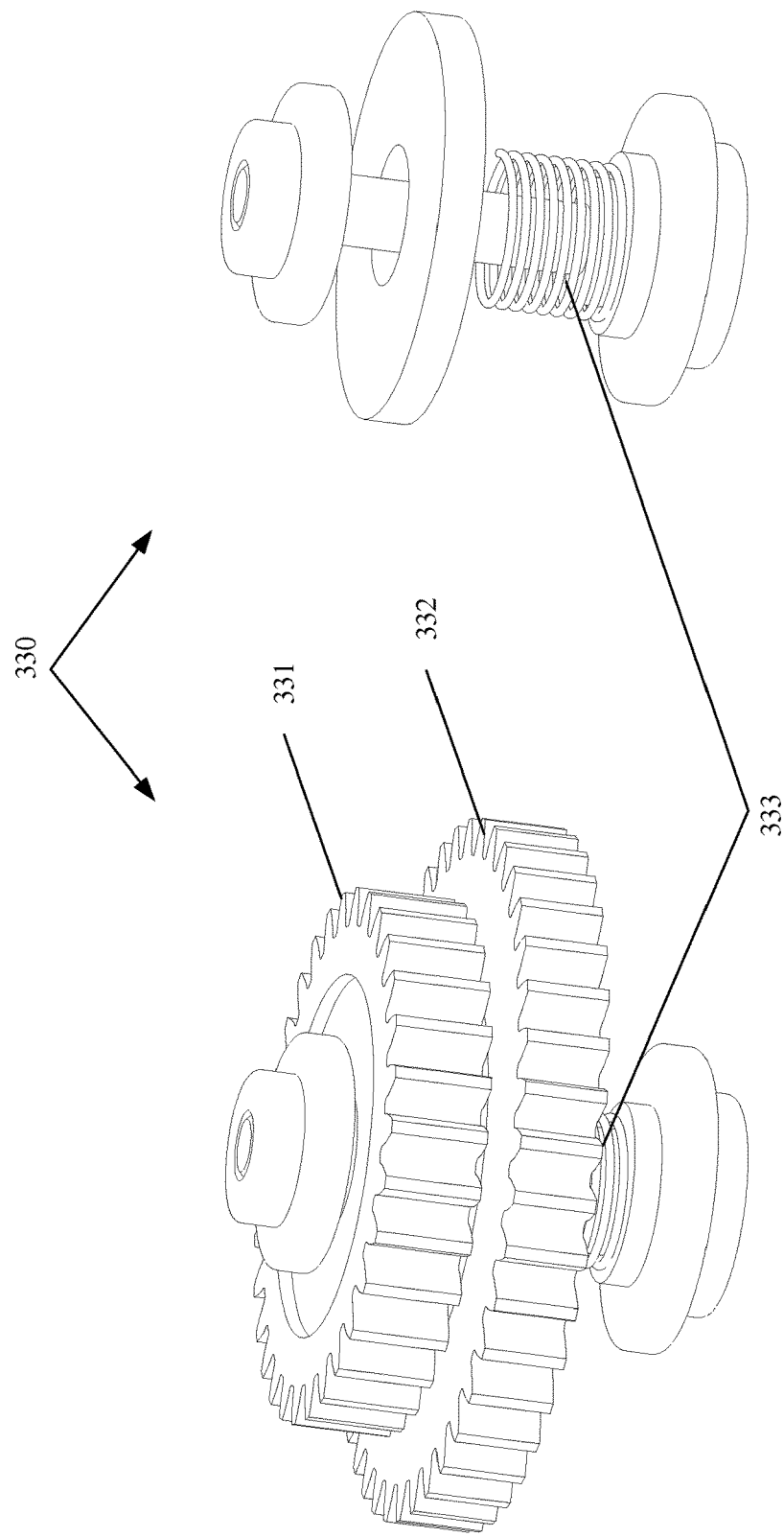
FIG. 7A is a perspective view of a clutch-gear.
FIG. 7B is a perspective view of a clutch-gear.

FIG. 7A is a perspective view of a clutch-gear and FIG. 7B is a perspective view of a clutch-gear with portions removed for clarity. As shown in FIG. 7A and FIG. 7B, the clutch-gear 330 includes a first gear 331, a second gear 332, and a spring 333. The spring 333 exerts a force on the second gear 332 and pushes the second gear 332 into the first gear 331. The first and second gears 331 and 332 are thus held together by friction. If a force on one gear exceeds the friction force holding the two gears together, the clutch-gear 330 will "slip" and the first and second gears will be free to move independently. The opposing faces (not shown) of the first and second gears can have mating surface features such as ribs, bars, or ridges to increase friction between the gears and prevent unintended slipping.

Figure 8:
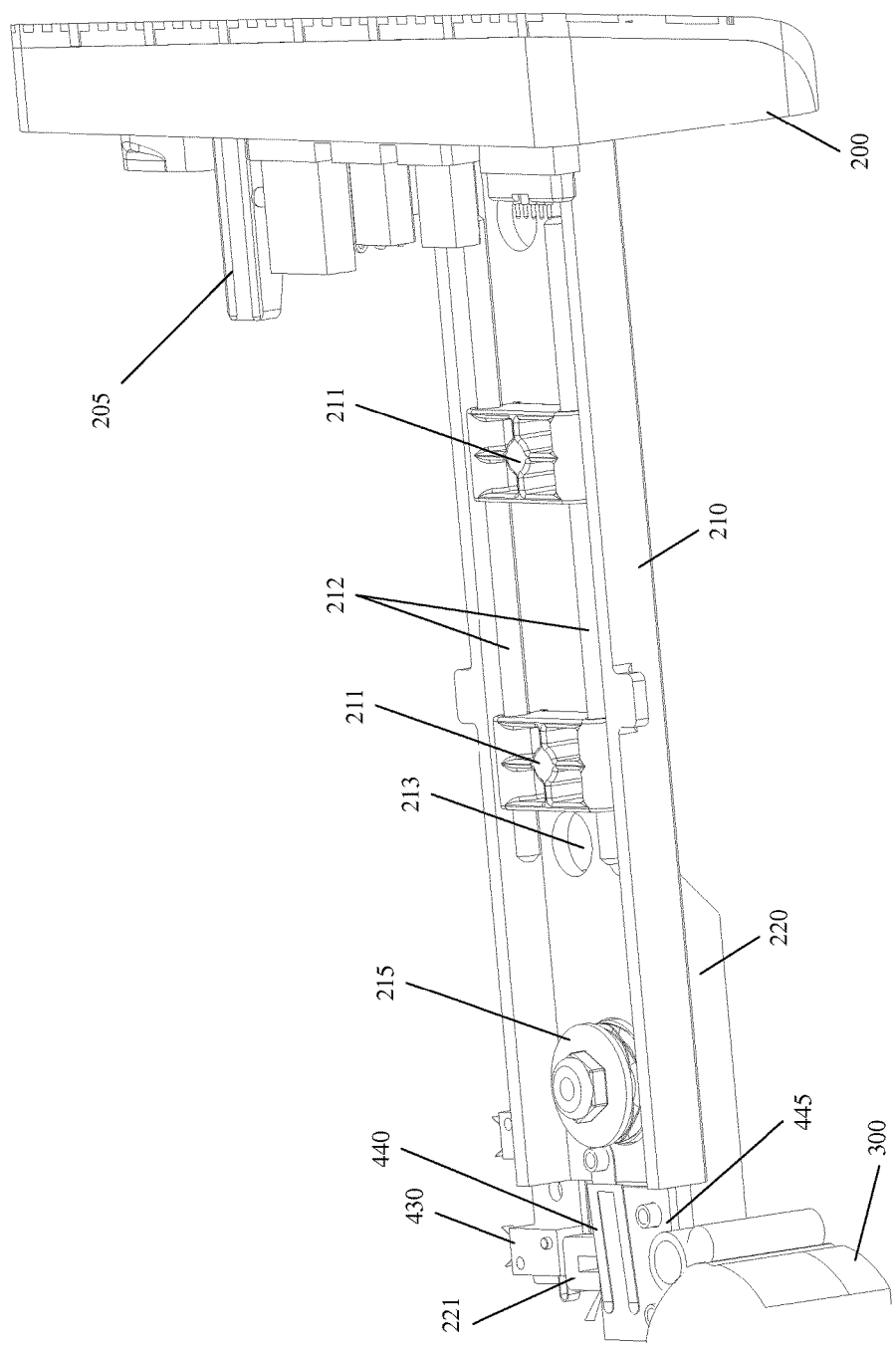
FIG. 8 is a perspective view of a connector block and arm.

FIG. 8 is a perspective view of a connector block and arm. As shown in FIG. 8 the connector block and arm includes a connector block 200, a block-side arm portion 210, an alignment arm 205, and a follower portion 220. The follower portion 220 includes a positioning indicator 221 for interfacing with the positioning sensor 430. The block-side arm portion 210 is connected to the follower portion 220 with a linear clutch assembly 215. The block-side arm portion 210 includes two rails 212 and two slider blocks 211. The slider blocks 211 can be fixed to the block-side arm portion 210. The rails 212 can slide freely within the slider blocks 211. The block-side arm portion 210 can include cutouts 213 to allow the passage of a screw or tool for securing the rails 212 to retention slots on the underside of the top cover (600 of FIG. 18).

The block-side arm portion 210 includes a sensor part 440 and the follower portion 220 includes a sensor part 445. The sensor part 445 can be a resistive pad that detects a change in resistance if the sensor part 440 moves. Together the sensor parts 440 and 445 can detect a movement between the block-side arm portion 210 and the follower portion 220. In normal operation the block-side arm portion 210 should be rigidly secured to the follower portion 220. In the event of a jam or misalignment of a component of the docking station, the linear clutch assembly 215 can slip allowing the follower portion 220 to move independently of the block-side arm portion 210. Those of skill in the art will appreciate that other sensor designs can detect movement between the block-side arm portion 210 and the follower portion 220.

Figure 9:
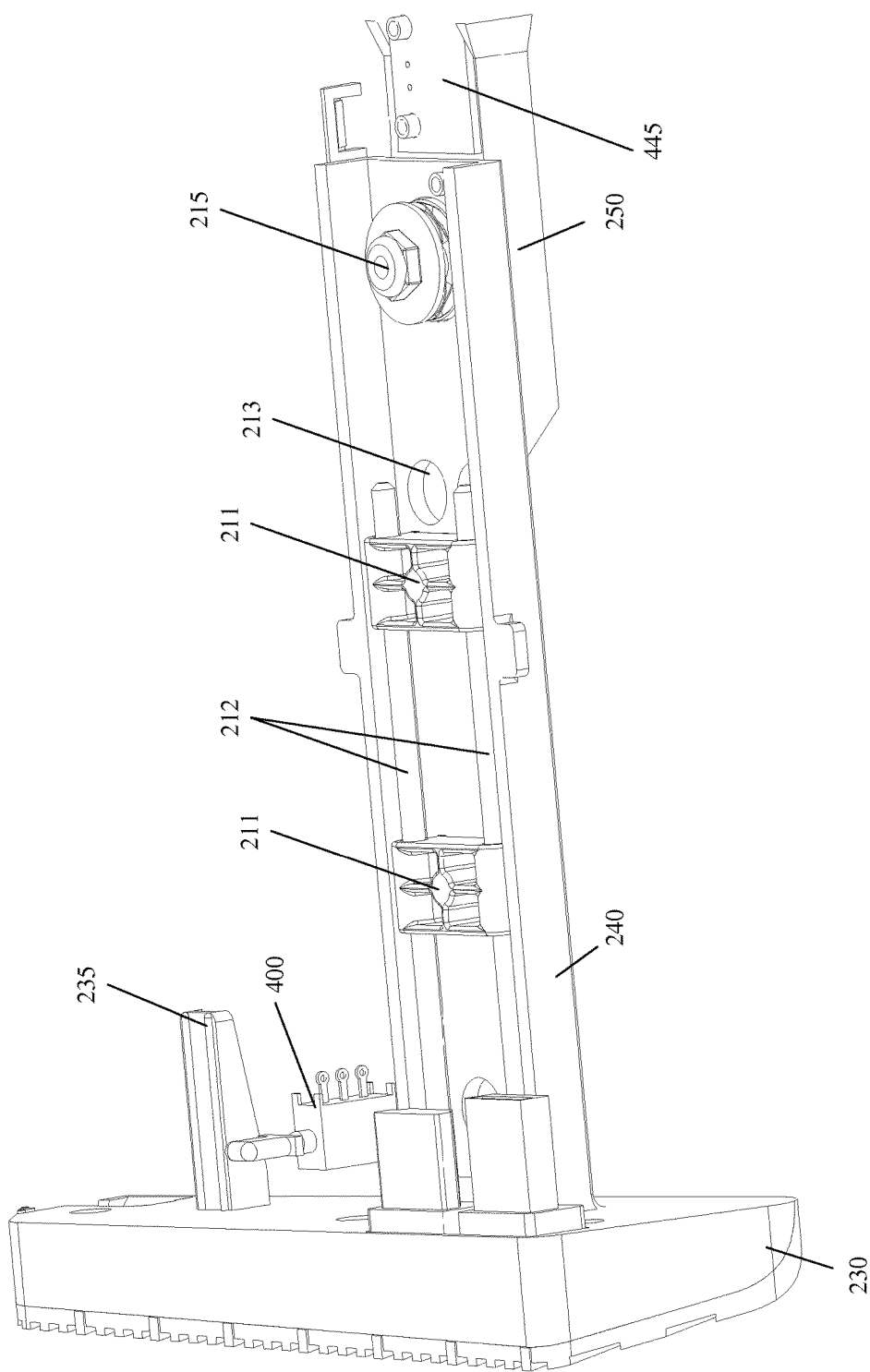
FIG. 9 is a perspective view of a connector block and arm.
Figure 18:
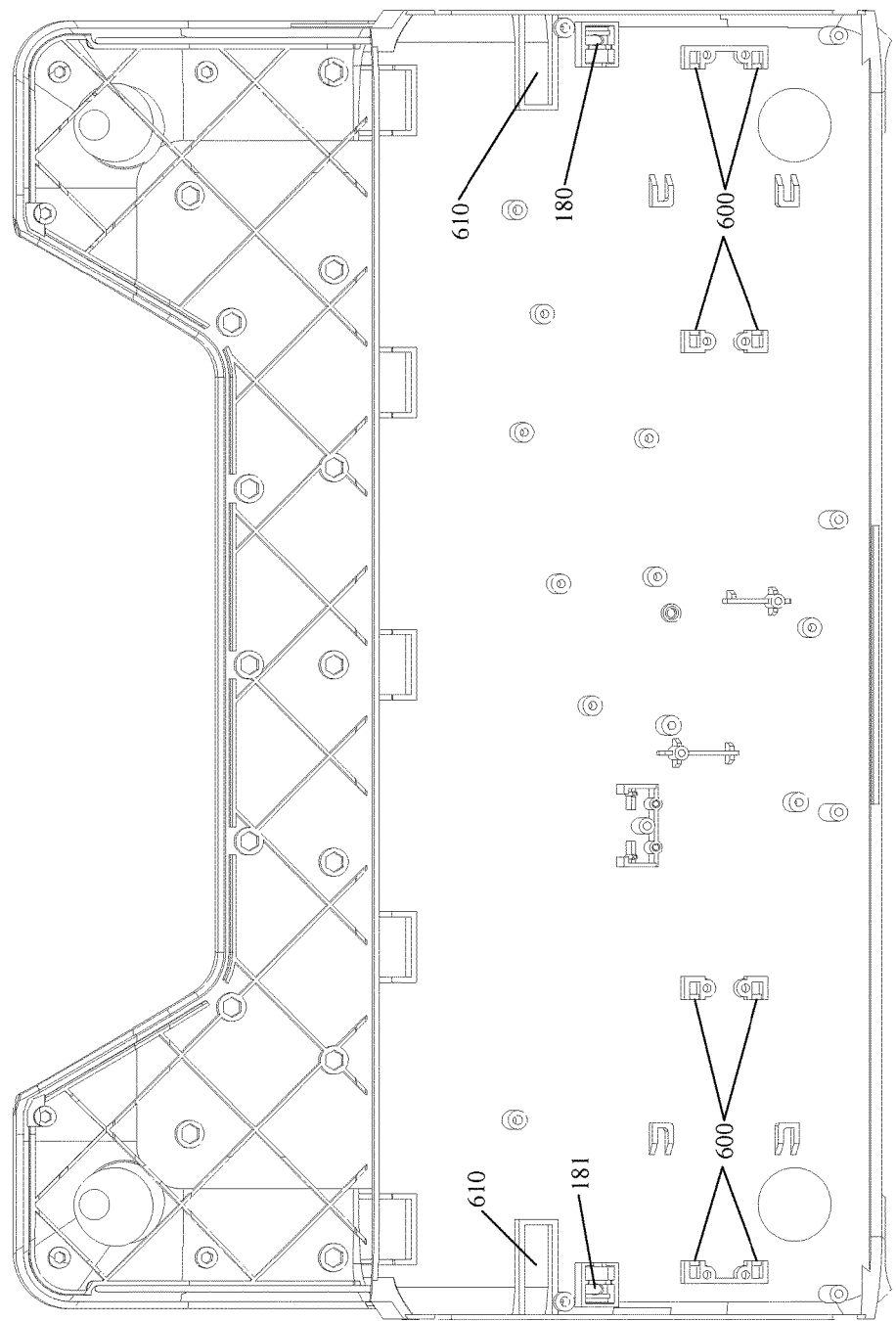
FIG. 18 is a bottom view of a top surface of a docking station for an electronic device.

FIG. 9 is a perspective view of a connector block and arm. As shown in FIG. 9 the connector block and arm includes a connector block 230, a block-side arm portion 240, an alignment arm 235, and a follower portion 250. The block-side arm portion 240 is connected to the follower portion 250 with a linear clutch assembly 215. The block-side arm portion 240 includes two rails 212 and two slider blocks 211. The slider blocks 211 can be fixed to the block-side arm portion 240. The rails 212 can slide freely within the slider blocks 211. The block-side arm portion 240 can include cutouts 213 to allow the passage of a screw or tool for securing the rails 212 to the underside of the top cover (FIG. 18). The block-side arm portion 240 can include a sensor part (not shown for clarity) similar to the sensor part 440 of FIG. 8. The follower portion 250 can include a sensor part 445.

Figure 10:
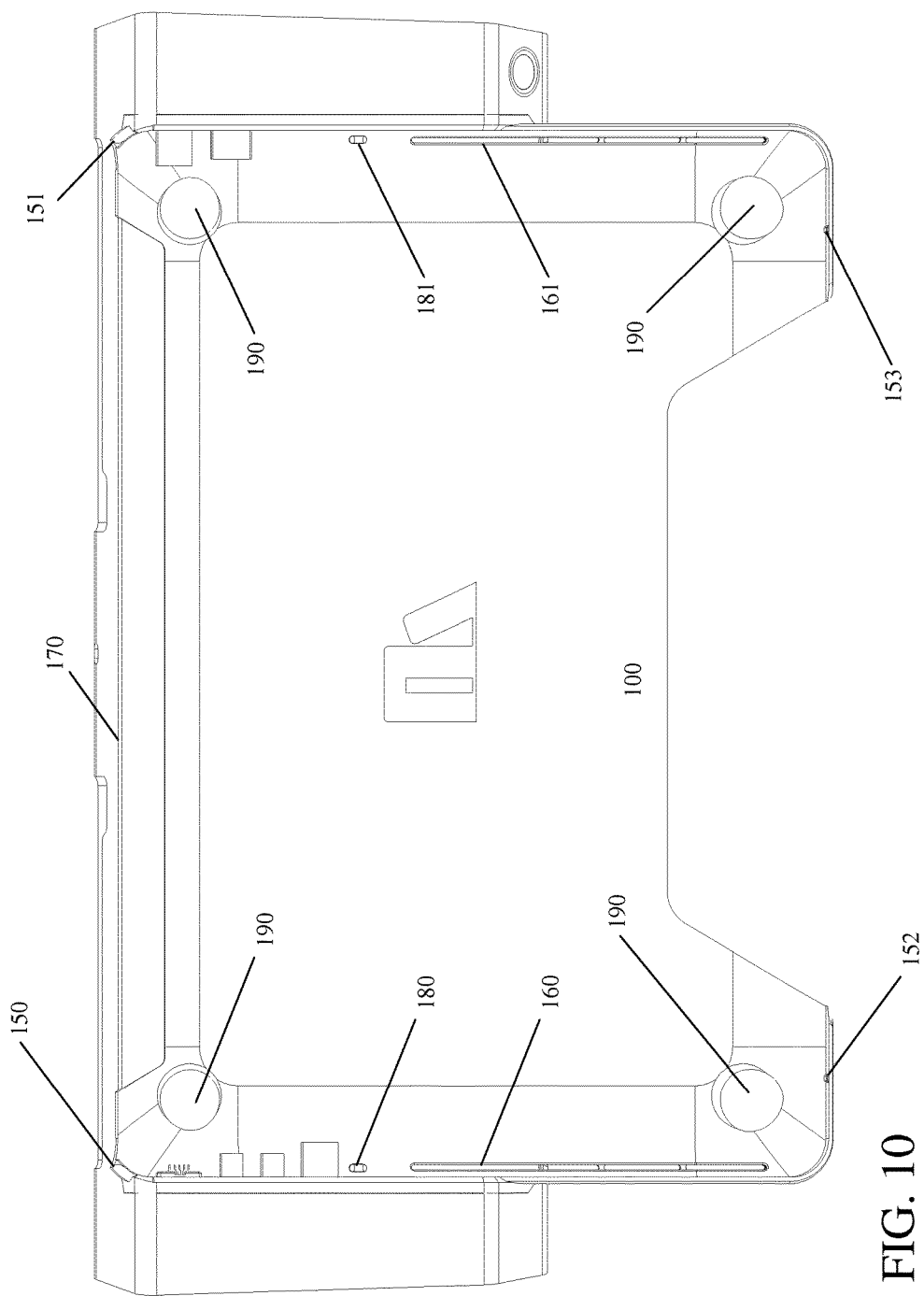
FIG. 10 is a top view of a docking station for an electronic device.

FIG. 10 is a top view of a docking station for an electronic device. As shown in FIG. 10, the docking station has a tray 100, indexing points 150, 151, 152, and 153, vent slots 160 and 161, vent notch 170, sensor holes 180 and 181, and recessed portions 190. The tray is shaped to receive an electronic device such as an Apple MacBook Pro. The tray has indexing points 150, 151, 152, and 153 to precisely position the electronic device within the tray. Indexing point 150 has a rounded portion positioned to indexing a rear surface and a first side surface of the electronic device. Indexing point 151 has a rounded portion positioned to indexing a rear surface and a second side surface of the electronic device. Indexing points 152 and 153 are protrusion from the tray 100 for indexing a front surface of the electronic device.

Vent slots 160 are positioned on the left and right sides of the tray 100 to allow airflow to the electronic device. Vent notch 170 extends along the back side of the tray 100 between indexing points 150 and 151. Vent notch 170 allows airflow to the electronic device.

Sensor holes 180 and 181 can correspond to the position of sensors 400 and 410 of FIG. 4. If the sensors 400 and 410 are mechanical button-style sensors, the sensors can protrude through the sensor holes 180 and 181. The sensors 400 and 410 can be depressed when an electronic device is inserted into the tray 100 to indicate to the docking station that an electronic device has been inserted. Recessed portions 190 are sized to be larger than a foot of the electronic device. The feet of an electronic device are frequently contacted through normal use and can become worn causing the feet to be poor indexing points. The recessed portions 190 allow the feet of an electronic device to free float in the recessed portions 190. The main surface of the tray can serve as an indexing point for the bottom of the electronic device.

FIGS. 11A-11D are a detailed perspective views of a top surface of the docking station for an electronic device. As shown in FIGS. 11A-11D the indexing points 150 and 151 can be rounded to match the contour of the electronic device. The indexing points 150 and 151 can contact a side surface and a rear surface of the electronic device. The indexing points 150 and 151 can contact a bottom surface of the electronic device. The indexing points 150 and 151 can be shorter than a thickness of the electronic device. In preferred embodiments of the invention the indexing points 150 and 151 are shorter than a base portion of the electronic device so that a screen of the electronic device can open freely without interference from the indexing points 150 and 151.

The vent notch 170 can be bounded on a left and right side by the indexing points 150 and 151. The vent notch 170 can be formed in the tray 100, and in preferred embodiments is generally referred to as the area bounded by the tray 100 and the dotted line.

FIG. 12 is a detailed perspective view of an arm of a connector block actuator with a linear clutch removed. As shown in FIG. 12, the connector block actuator includes a block-side arm portion 210 and a follower portion 220. The block-side arm portion 210 has a cutout 214. The follower portion 220 has a slot 222. The block-side arm portion 210 can have a sensor part 440 and the follower portion 220 can have a sensor part 445. The docking station can include a sensor 430 for detecting the position of the connector block (not shown). The sensor 430 can detect the position of a tab 221 or other movable feature and thereby infer the position of the connector block (not shown).

Figure 13:
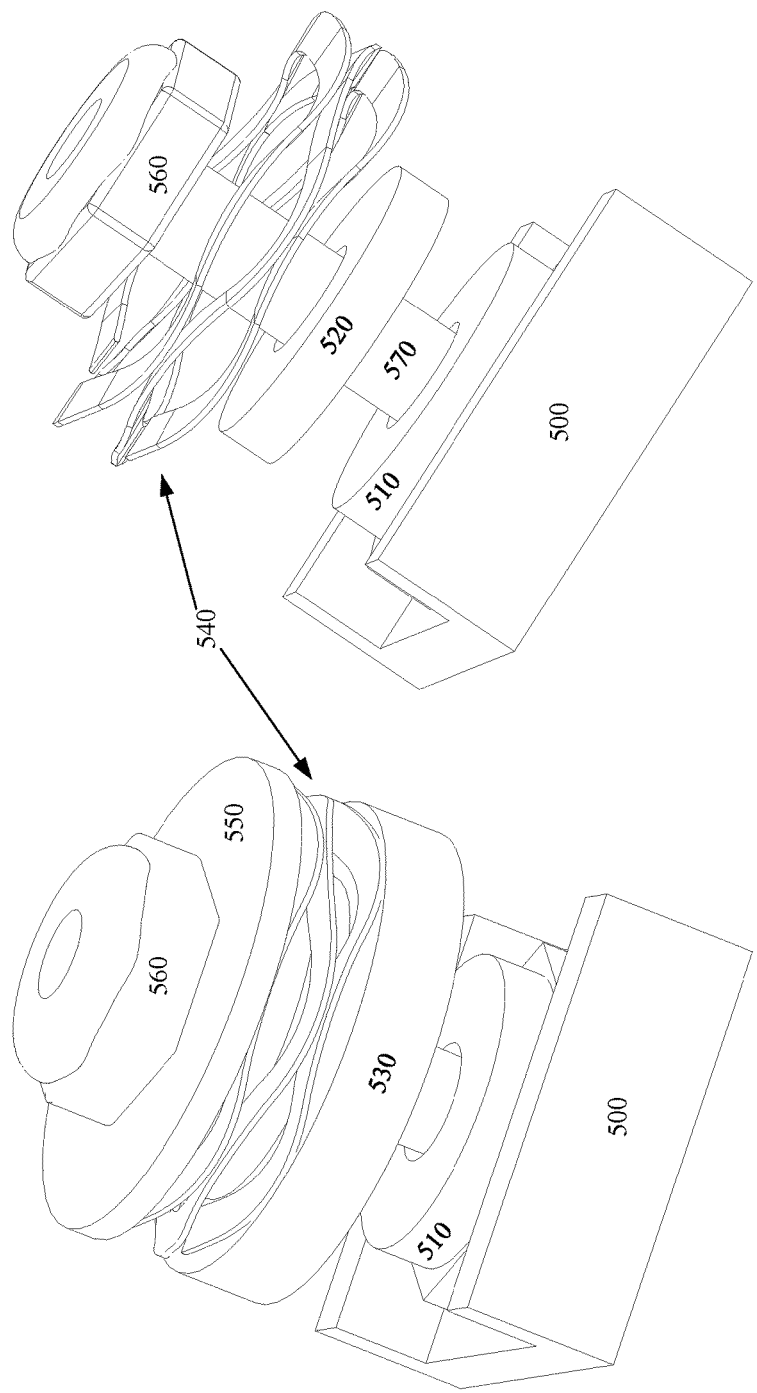
FIG. 13A is a perspective view of a connector assembly for a linear clutch.
FIG. 13B is a perspective view of a connector assembly for a linear clutch.

The block-side arm portion 210 can be connected to the follower portion 220 by a linear clutch (See FIG. 13A). In the event of an obstruction or jam, the block-side arm portion 210 can slide in the direction of the slot 222 of the follower portion 220.

FIG. 13A and FIG. 13B are a perspective views of a connector assembly for a linear clutch. The linear clutch of FIG. 13B has portions removed for clarity. As shown in FIG. 13A and FIG. 13B, a linear clutch has a bottom alignment member 500, a bottom slider member 510, a top slider member 520, a bottom washer 530, a spring 540, a top washer 550, and a bolt 560. The bolt 560 has a slot portion 570. The bolt 560 can thread into the bottom alignment member 500 to tighten the assembly.

Referring to FIGS. 12, 13A, and 13B, the top surface of bottom slider member 510 can contact a bottom surface of the follower portion 220. The follower portion 220 can have a channel shape and the bottom alignment member 500 can be sized to fit in the channel of the follower portion 220. The bottom surface of the top slider member 520 can contact a top surface of the follower portion 220. The top and bottom slider members 510 and 520 can be formed from plastic or metal. The bottom washer 530 can exert an even force on the top slider member 520. The bottom washer member 530 can be sized to fit in the hole 214 of the block-side arm portion 210.

The linear clutch can have a spring 540. The spring 540 can be compressed to apply a constant force to the components of the linear clutch. The top washer 550 can be positioned on top of the spring 540 and below the head of the bolt 560. When the bolt 560 is tightened, the head of the bolt 560 applies a force to the top washer 550 which in turn compresses the spring 540. A slot portion 570 of the bolt 560 can pass through the slot 222 of FIG. 12.

The linear clutch can be tightened so that the block-side arm portion 210 and the follower portion 220 are held fast during normal operation. In the event that the actuator mechanism becomes jammed or blocked, the clutch can "slip" to allow the block-side arm portion 210 to slide in the direction of the slot 222 of the follower portion 220. This slipping feature can prevent damage to the docking mechanism or electronic device in the event of an error.

A slip of the linear clutch can be detected by the sensor parts 440 and 445 of FIG. 12. If a slip is detected, the docking station can be programmed to cause the port-blocks to open to their maximum positions thereby resetting the linear clutch to where the slot portion 570 of the bolt 560 is in the left most side of the slot 222 of FIG. 12.

Figure 14:
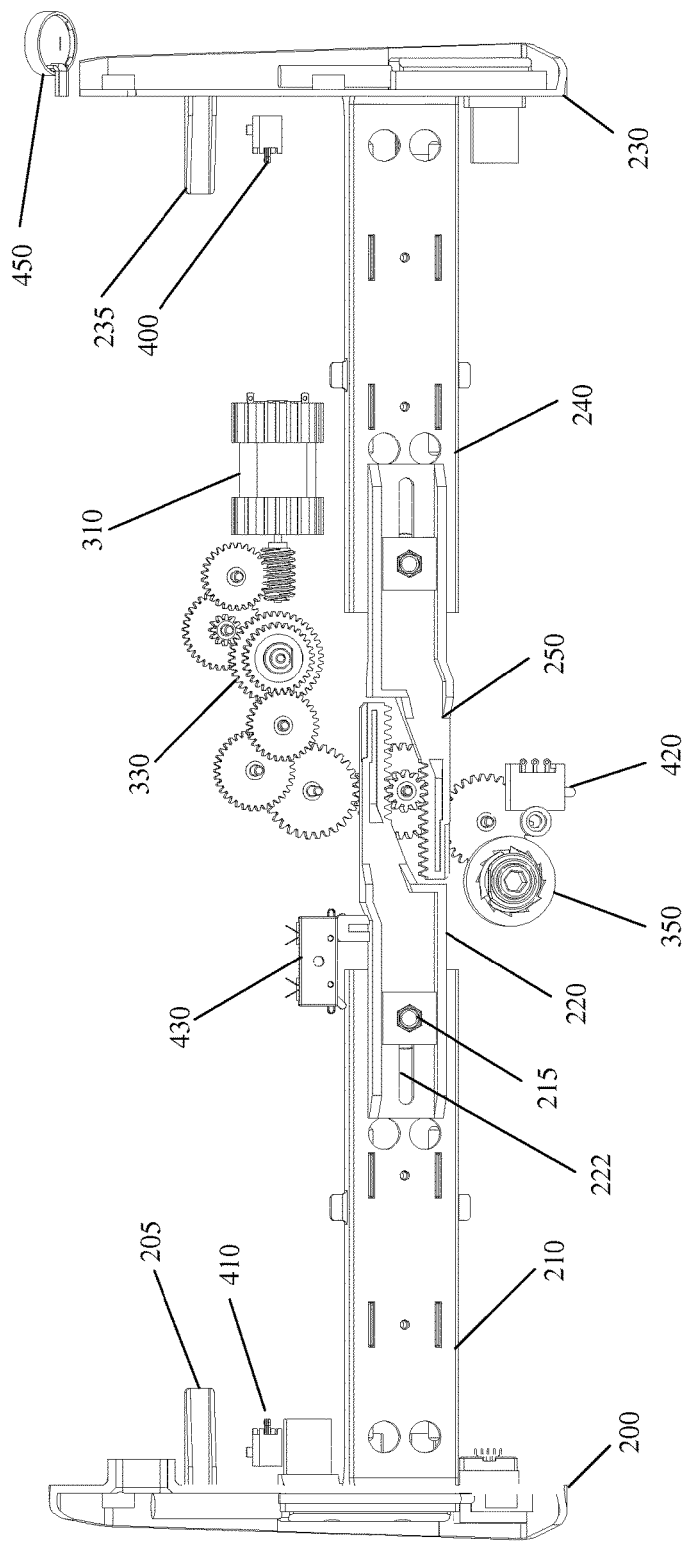
FIG. 14 is a bottom view of connector block actuator of a docking station for an electronic device.
Figure 15:
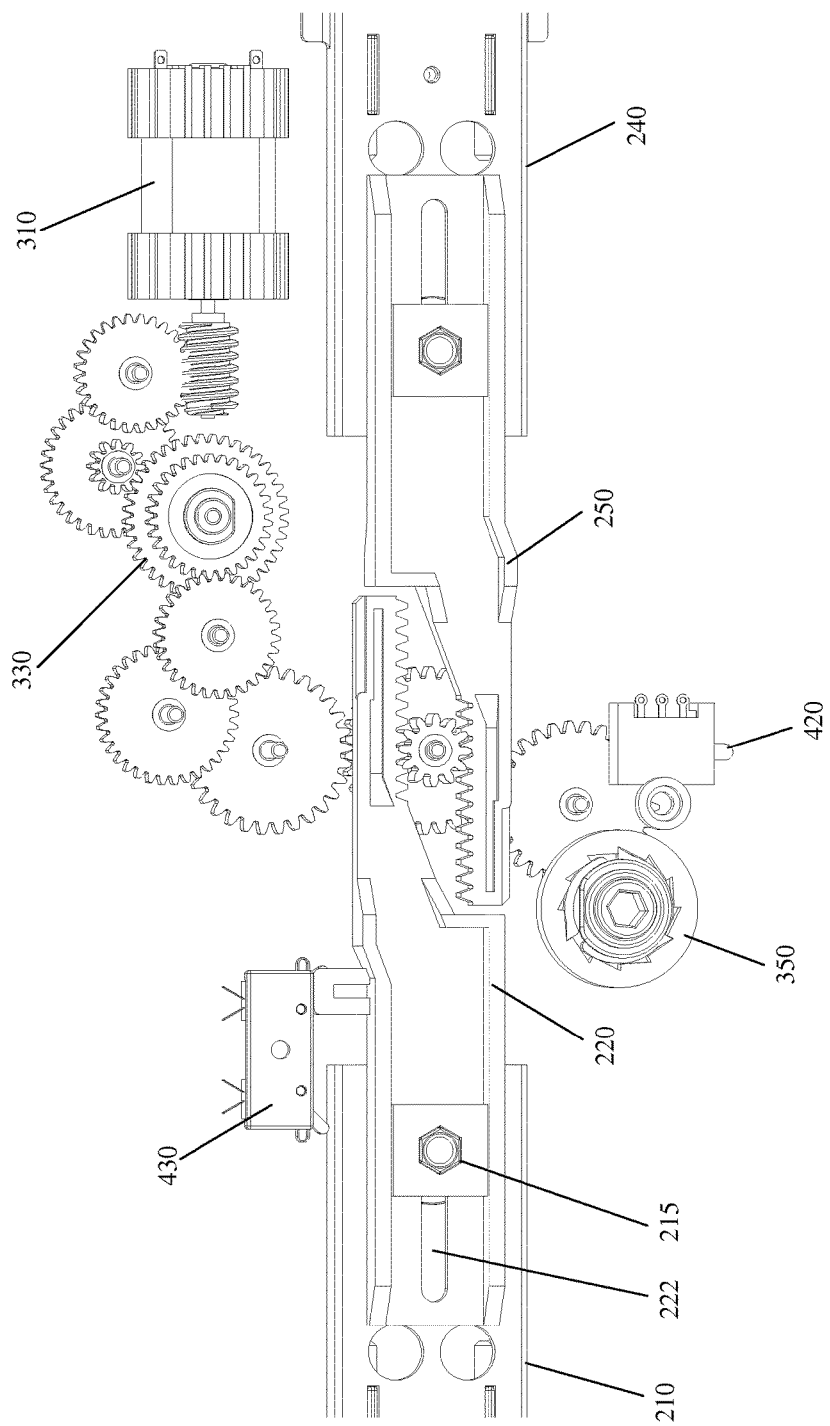
FIG. 15 is a detail bottom view of the connector block actuator of FIG. 14.
Figure 16:
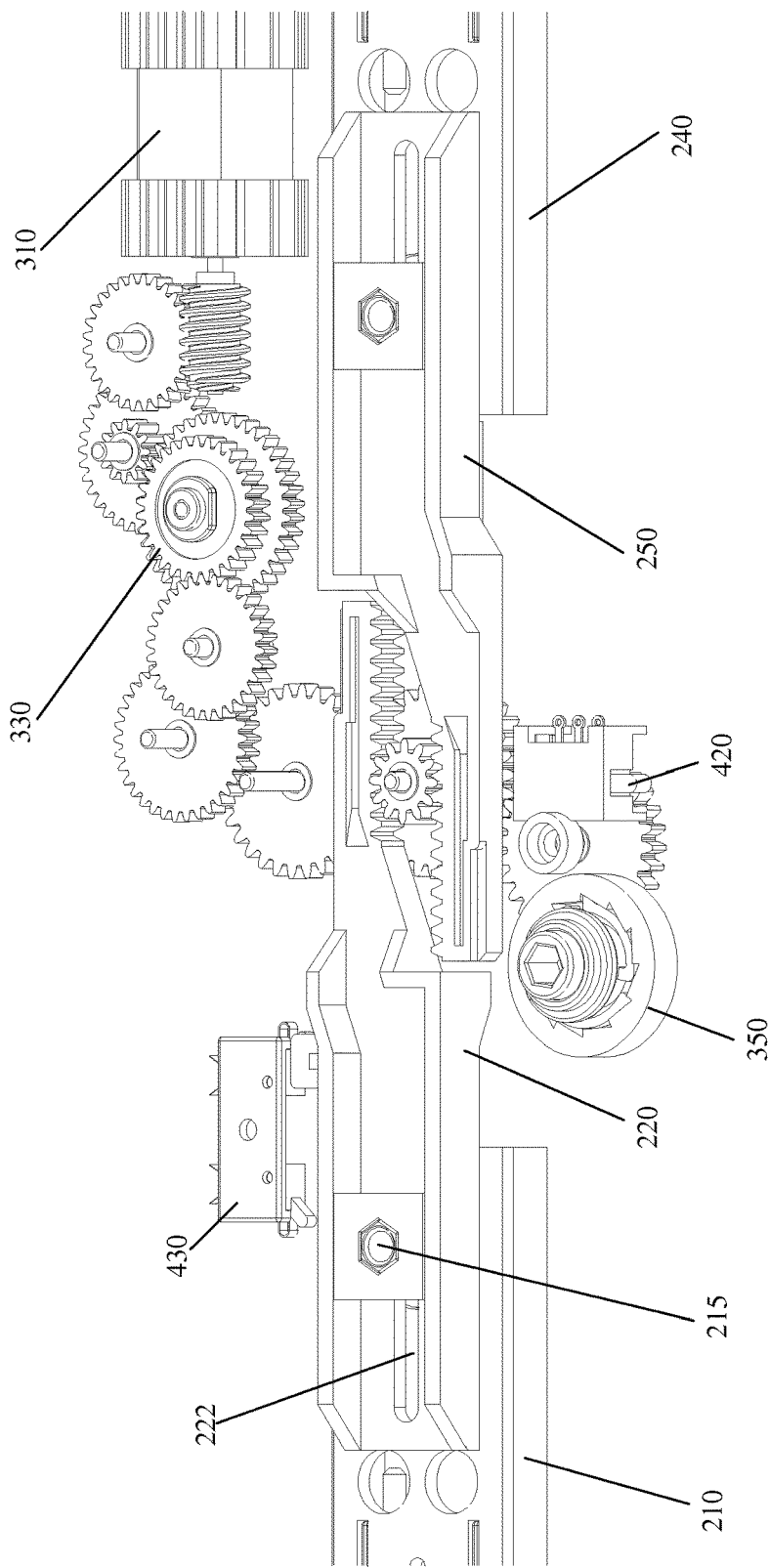
FIG. 16 is a detail perspective view of the bottom of the connector block actuator of FIG. 14.

FIG. 14 is a bottom view of connector block actuator of a docking station for an electronic device, FIG. 15 is a detail bottom view of the connector block actuator of FIG. 14, and FIG. 16 is a detail perspective view of the bottom of the connector block actuator of FIG. 14. As shown in FIG. 14, FIG. 15, and FIG. 16, a connector block actuator can include connector blocks 200 and 230. The connector block 200 is has a block-side arm portion 210, a follower arm portion 220, and an alignment arm 205. The connector block 230 is has a block-side arm portion 240, a follower arm portion 250, and an alignment arm 235. The connector block actuator includes a motor 310, clutch gear 330, and emergency override gear 350. The docking station includes sensor 400 for detecting when an electronic device is properly inserted into the docking station. The docking station can have a symmetrical sensor 410 on the opposite side near connector block 200. The docking station can include a sensor 420 for detecting when a lock is inserted in the security hole 140 of FIG. 1. The docking station can include a button 450 for causing the dock to open or close the port blocks 200 and 230. The button 450 can be a capacitive touch button. The follower portion 220 can have a slot 222. The block-side arm portion 210 can be connected to the follower portion 220 by a linear clutch 215.

Figure 17:
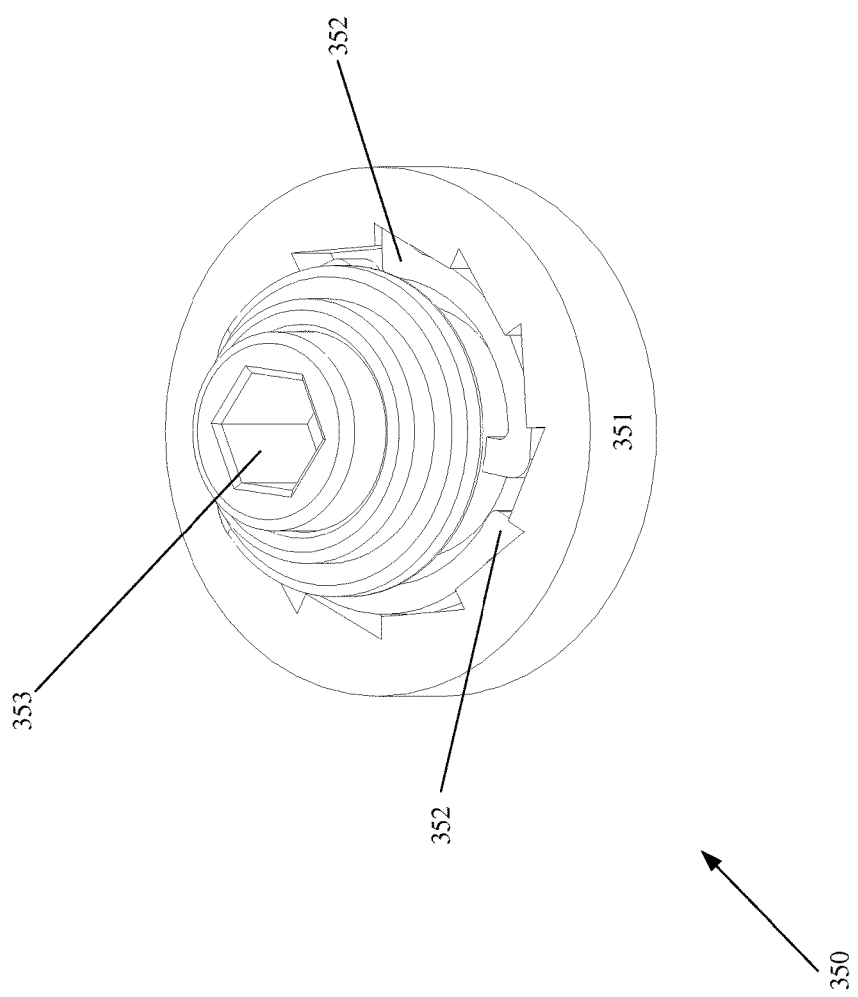
FIG. 17 is a perspective view of an emergency override gear.

FIG. 17 is a perspective view of an emergency override gear. As shown in FIG. 17, the emergency override gear 350 includes a lock-collar 351, locking members 352, and a manual interface 353. The lock-collar 351 can surround the locking members 352. The locking members 352 can interface with teeth of the lock-collar 351. The manual interface 353 can be a keyed interface for accepting a tool such as an allen wrench or screw driver. The effect of the lock-collar 351 and locking members 352 can be to only allow the manual interface 353 to be turned in a single direction. The single direction can be the direction associated with opening the port blocks of the docking station.

FIG. 18 is a bottom view of a top surface of a docking station for an electronic device. As shown in FIG. 18, the bottom-side of the top surface of the docking station can include retention slots 600 for the rails 212 of FIG. 8. A screw can secure the rails 212 of FIG. 8 in the retention slots 600. The bottom-side of the top surface can include sensor holes 180 and 181 and alignment slots 610. The alignment slots 610 can be shaped and positioned to accommodate the alignment arms 205 and 235 of FIG. 2. The sensor holes 180 and 181 can be positioned to allow the sensors 400 and 410 of FIG. 4 to detect whether an electronic device is in position for docking.

Figure 19:
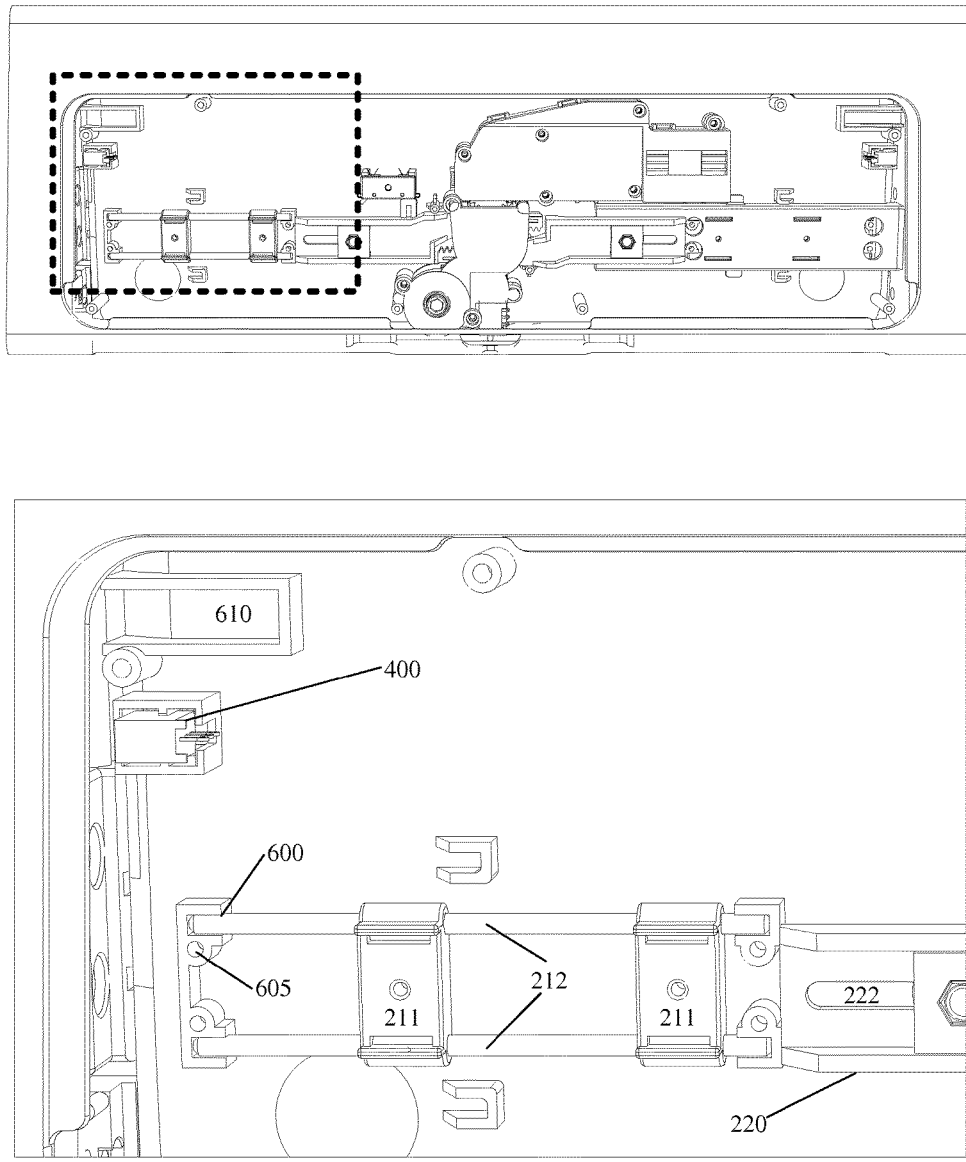
FIG. 19 is detail view of a slide mechanism for an arm of a connector block actuator.

FIG. 19 is detail view of a slide mechanism for an arm of a connector block actuator. In FIG. 19, the block-side arm portion (210 of FIG. 4) has been removed for clarity. As shown in FIG. 19, the slide mechanism includes rails 212 and slider blocks 211. The rails 212 can be sized to fit into retention slot 600. The rails can be held in the retention slot 600 by inserting an appropriately sized screw or other fastener into hole 605. The slider blocks 211 can be attached to the block-side arm portion (210 of FIG. 4) and can slide freely on the rails allowing the port block (200 of FIG. 4) to slide between an open and closed position.

This configuration is advantageous as the main connection points for the moving parts are located on the underside of the top tray. The indexing points for positioning the electronic device are on the top surface of the top tray. In this way, the components of the docking station that require the most precision can be anchored to common structural element such as the top tray. Such a configuration can limit tolerance stacking as the anchor points for moving parts can be located on the same structural element as the indexing members.

Figure 20:
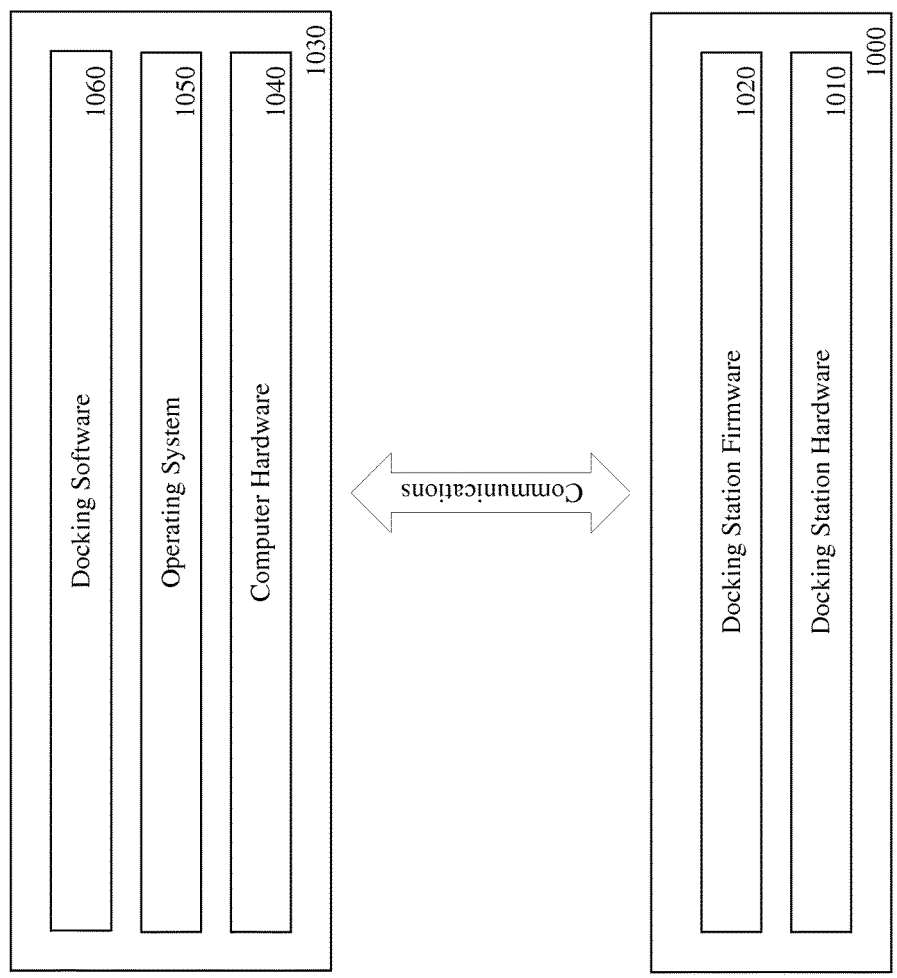
FIG. 20 is a block diagram of hardware and software systems according to an exemplary embodiment of the invention.

FIG. 20 is a block diagram of hardware and software systems according to an exemplary embodiment of the invention. As shown in FIG. 20, the system includes docking station components 1000 and electronic device components 1030. The docking station components include the docking station hardware components 1010 and the docking station firmware components 1020. The electronic device components 1030 include the electronic device hardware components 1040, electronic device operating system 1050, and electronic device docking software components 1060.

With reference to the docking station components 1000, the docking station hardware components 1010 can include the physical structures that enable the docking station such as electronics, circuit boards, gears, motors, etc. More specifically, the docking station hardware components 1010 can include the structures shown in FIG. 1-FIG. 19. The docking station hardware components 1010 can include a docking station controller that includes docking station firmware 1020. The docking station controller can have a USB connection to one of the plurality of plugs 110 shown in FIG. 1.

The operation of the docking station controller can be governed by the docking station firmware 1020. The docking station controller and docking station firmware 1020 can receive inputs from sensors 400, 410 of FIG. 4, switches 420, and 430 of FIG. 4, and sensor 440 of FIG. 12. The docking station controller and docking station firmware 1020 can control the motor 310 of FIG. 4. The docking station controller and docking station firmware 1020 can include a communications function for communicating with the electronic device 1030 present in the docking station. The communications can be, for example, via a USB connection.

The docking station firmware 1020 can receive a signal from sensors 400, 410 of FIG. 4 to determine whether an electronic device is properly positioned within the tray 110. The docking station firmware 1020 can receive a signal from switch 430 to determine whether the connector block is in the open or closed position. Switch 420 can be a reset switch that, when pressed, sends a signal to the docking station firmware 1020. The docking station firmware 1020 can interpret the signal from the switch 420 and reset the docking station to a factory defaults. The docking station firmware 1020 can interpret the signal from the switch 420 and cause the port blocks to move to an open position.

The docking station firmware 1020 can have a firmware upgrade feature such that the firmware can be updated via USB. The docking station firmware 1020 can receive a signal from sensor 440 to indicate a slippage in the mechanical components. In the event of a slippage, the docking station firmware can mechanically reset the dock by running the motor in reverse thus opening the port blocks to the maximum position.

The docking station firmware 1020 can control the motor 310 to open and close the port blocks. The docking station firmware 1020 can monitor the current draw of the motor as an indicator of an error condition. In the event of a jam or misalignment, the motor will work harder, turn slower, and accordingly draw additional current. The current draw of the motor 310 can also indicate that the port blocks are fully inserted into the docking station. For example, as motor 310 draws the port blocks into the electronic device, the motor 310 will turn slower, and therefore draw more current, when the port blocks are fully inserted. One of skill in the art will appreciate that the docking station firmware could similarly monitor a voltage drop instead of the current draw to achieve the same sensor capabilities.

The electronic device hardware components 1040 can include standard computer components such as keyboard, monitor, mouse, motherboard, network card, WiFi/Bluetooth, and hard drive. The electronic device operating system 1050 can be any operating system such as Apple's OSX, Microsoft Windows, or Linux variant. The electronic device docking software components 1060 can be used to interface with the docking station 1000 and more particularly, the docking station firmware.

The electronic device docking software components 1060 can include a messaging module that can send a message to the docking station firmware 1020 to open or close the port blocks (i.e. dock or undock). The electronic device docking software components 1060 can receive a message from the docking station that a user has pressed an "undock" button and cause the electronic device to dismount attached storage devices. The electronic device docking software components 1060 can send a message to the docking station firmware 1020 to set the docking station to a locked or unlocked state. When in a locked state, authorization can be required to open or undock the electronic device or to set the docking station to an unlocked state.

The electronic device docking software components 1060 can be used to select an audio input/output device with audio input/output selection modules. In preferred embodiments, a docking station includes a USB audio device and a PCIe audio device. The USB audio device can be have an input/output of standard 3.5 mm or ⅛" headphone jack. The PCIe audio device can be an audio device connected to a display device such as a display connected via thunderbolt. In certain embodiments, the docking station can include a HDMI audio device, such as the audio device and speakers of an external monitor connected to the docking station via HDMI. In this instance the electronic device docking software components 1060 can selectively enable any of the connected audio devices. The electronic device docking software components 1060 can further enable/disable or mute/unmute an internal audio device of the electronic device.

The electronic device docking software components 1060 can include a dismount module to automatically dismount all externally attached storage devices. The dismount module can ensure that all write buffers have been written to disk and that all attached storage devices have been cleanly dismounted before undocking.

The electronic device docking software components 1060 can further include a profile manager. The profile manager can set the electronic to a particular state given a set of conditions. For example, in the case where the electronic device is docked with an external monitor, the profile manager can position preselected windows onto the external monitor. Similarly, when undocked, the profile manager can reposition the windows onto a screen of the electronic device. The profile manager can further enable a preselected audio device based upon the device being in a docked/undocked state.

The profile manager can determine a profile based upon a set of conditions. As an example of a condition, the profile manager can detect the presence of the docking station to know that the electronic device is in a "docked" state. Similarly, the profile manager can detect the presence of a particular Wifi access point, attached peripheral, or GPS coordinates to determine that the electronic device is at home, office, or other location associated with a profile. The conditions that define a profile can be set by a user. The device settings for a given profile can also be set by a user. For example, profile manager can detect that the electronic device is in a docked state and near an access point "X" associated with an office and, in response, position an email window on an external monitor and select an audio device associated with headphones. When the electronic device is undocked, the profile manager can still detect the presence of access point X and reposition the email window to the monitor of the electronic device and selects/enables an internal audio device of the electronic device. When the electronic device is subsequently in a docked state and detects an attached peripheral associated with a home location, the docking station can, for example, position an audio player window on an external monitor and select an audio device associated with a home stereo system.

Figure 21:
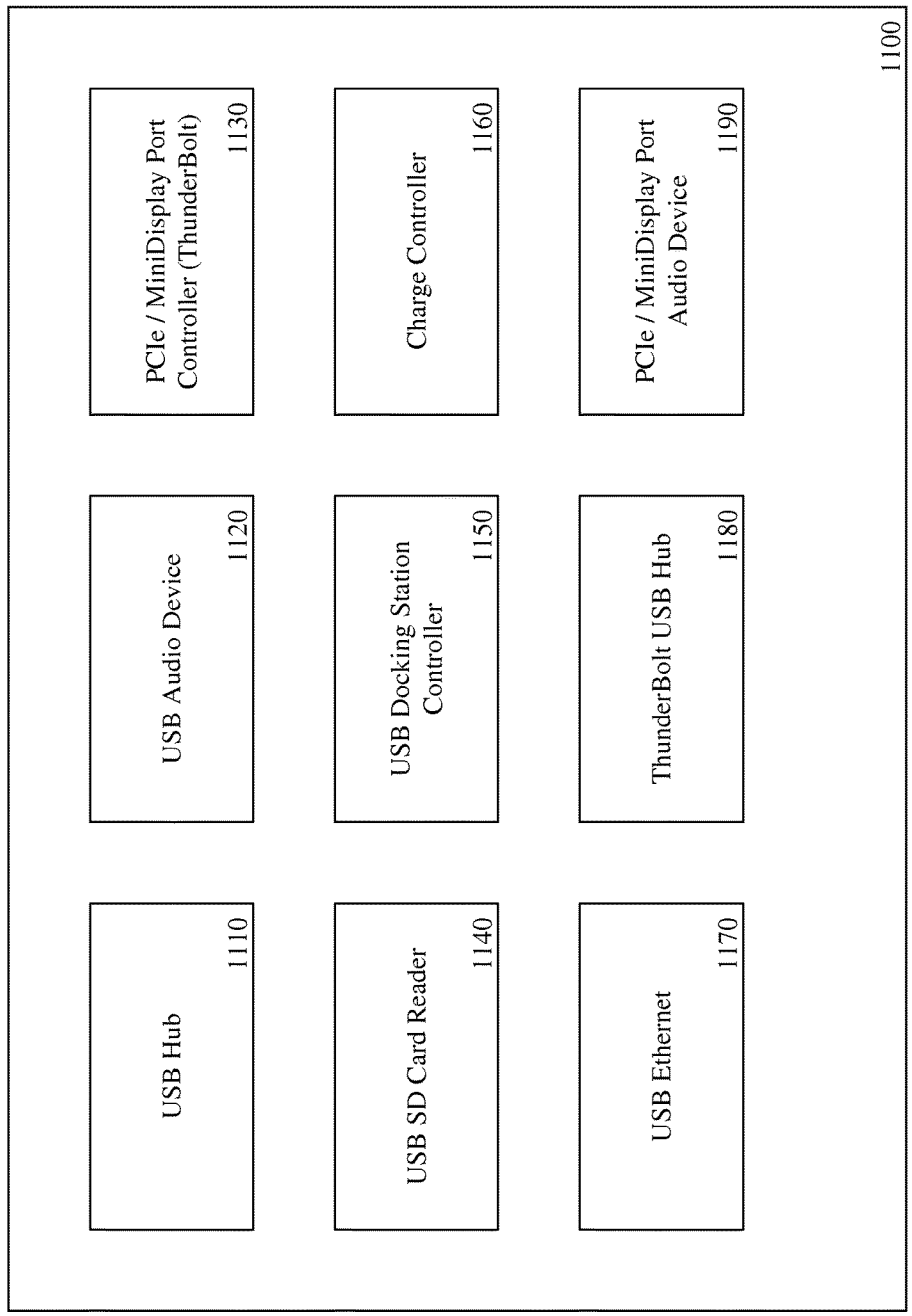
FIG. 21 is a block diagram of the electronic hardware components of a docking station according to an exemplary embodiment of the invention.

FIG. 21 is a block diagram of the electronic hardware components of a docking station according to an exemplary embodiment of the invention. As shown in FIG. 21, the docking station 1100 includes a USB hub 1110, USB audio device 1120, a PCI/MiniDisplay Port controller (ThunderBolt) 1130, a USB SD card reader 1140, a USB docking station controller 1150, a charge controller 1160, a USB Ethernet device 1170, a ThunderBolt USB Hub 1180, and a PCIe/MiniDisplay Port Audio Device 1190.

The USB Hub 1110 can be electrically connected to a USB plug on the docking station. When in a closed or docked position, the USB plug can interface with a corresponding port of the electronic device. The USB hub 1110 can allow many USB devices to be connected to a single USB port of the electronic device. The USB audio device 1120, USB SD card reader 1140, and USB Ethernet device 1170 can be connected to the USB hub 1110. The USB docking station controller 1150 can be connected to the USB hub 1110 or be electrically connected to a USB plug on the docking station that interfaces with a corresponding port of the electronic device.

The charge controller 1160 can receive electrical power from an external power source and provide power to the electronic device via the plurality of pins 130 shown in FIG. 1. The charge controller 1160 can communicate with components of the electronic device to determine the charge level, temperature, and charge rate of a battery of the electronic device. The charge controller 1160 can optionally convert AC power to DC power or DC power to DC power.

The PCI/MiniDisplay Port controller (ThunderBolt) 1130 can be connected to the electronic device through the docking station via a ThunderBolt plug. The PCI/MiniDisplay Port controller 1130 can have a number of output ports that are disposed on a rear portion of the docking station and can be used to attach external monitors and other ThunderBolt devices. The PCIe/MiniDisplay Port Audio Device 1190 can be connected to the PCI/MiniDisplay Port controller 1130. The ThunderBolt USB Hub 1180 can be connected to the PCI/MiniDisplay Port controller 1130 to provide a plurality of USB ports. In certain embodiments, the USB Ethernet device 1170 can be connected to the PCI/MiniDisplay Port controller 1130 rather than connected via USB.

Those of skill in the art will appreciate that a variety of communications devices such as USB, Ethernet, Thunderbolt, Firewire, etc, can be integrated into the docking station and connected to the electronic device via an appropriate connector or communications protocol. Therefore, while particular communications technologies have been discussed herein, one of skill in the art will appreciate that other communications technologies can be substituted for those explicitly disclosed.

Figure 22A:
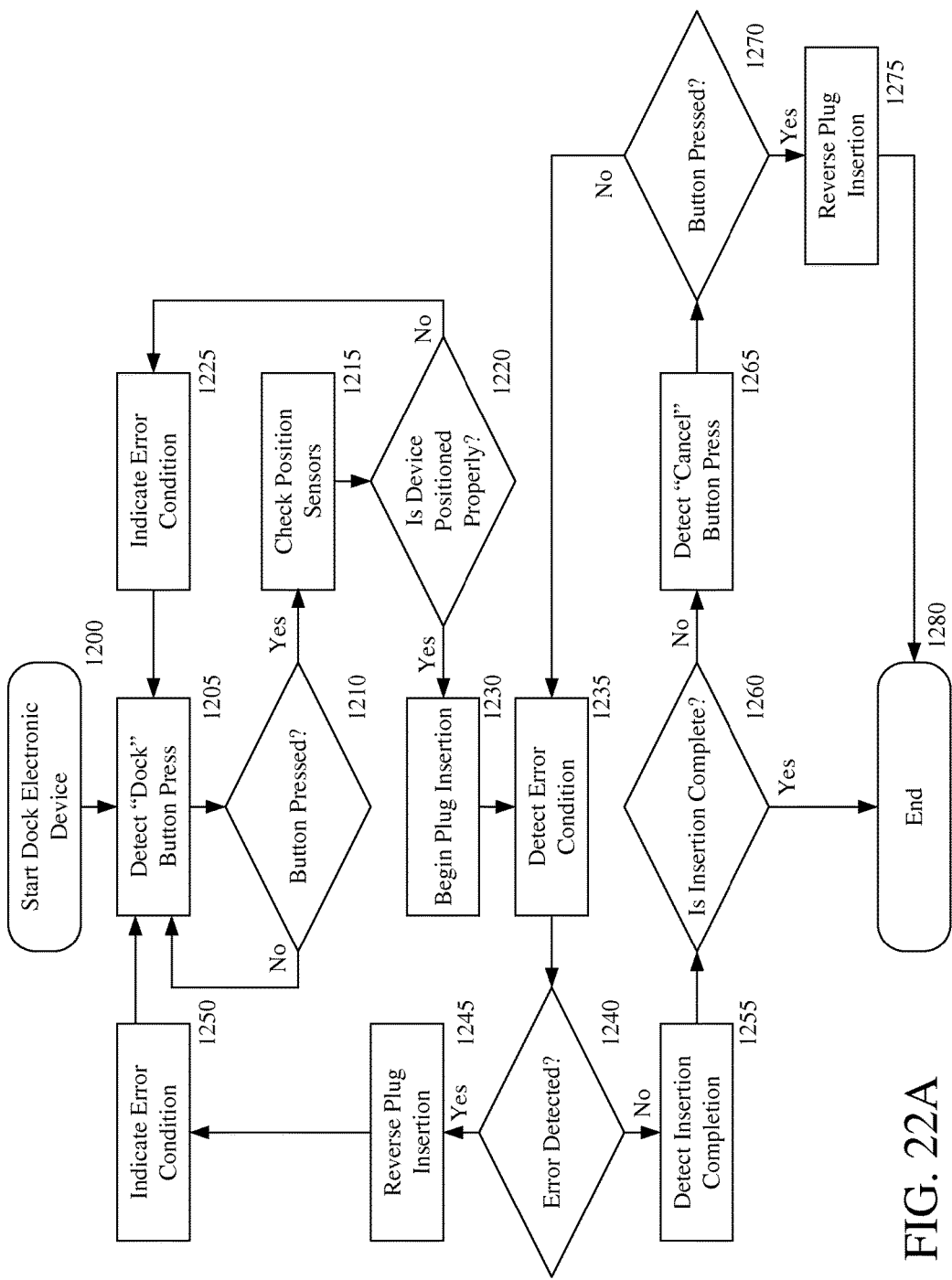
FIG. 22A is a flow chart for docking an electronic device according to an exemplary embodiment of the invention.

FIG. 22A is a flow chart for docking an electronic device according to an exemplary embodiment of the invention. As shown in FIG. 22A, docking begins in step 1200 and can be initiated by a button press 1205 or other signal from a user. The dock controller and firmware can detect the button press 1205. If the button has not been pressed, the dock controller can wait or listen for a button press 1205 in the future. If the button has been pressed, the dock controller can check 1215 position sensors in the docking station to determine if an electronic device is present in the docking station and can detect if the electronic device is properly seated so that the plugs can enter the electronic device smoothly without binding. The position sensors can be the sensors shown in FIG. 4, reference numerals 400 and 410.

The dock controller can read the input from the position sensors to determine 1220 if the electronic device is properly positioned. If the device is not properly positioned, the docking controller can indicate an error condition 1225. In preferred embodiments of the invention, the docking station has a ring-shaped light surrounding a "dock" button. In the event of an error condition 1225, the controller can change the color or display of the ring-shaped light to indicate the error condition. For example, the light can be blue or green and change to red or amber to indicate an error condition. The dock can revert to blue or green after five seconds. In the alternative, the dock can include a speaker or piezoelectric buzzer to emit a chirp or series of chirps in the event of an error condition. In the alternative, the dock can send an audio signal to an attached audio device to play an error sound over attached speakers. After the error condition 1225 is indicated, the dock can revert to the "waiting" state 1205 where the dock controller is listening for a button press or other indicator that docking is to commence.

If the electronic device is properly positioned, the docking controller can begin inserting 1230 the plugs into the electronic device. In preferred embodiments of the invention, the force to insert the plugs is provided by a motor. While the plugs are being inserted, the docking controller can detect an error condition 1235. An error condition 1235 can be, for example, that the plugs have become jammed or are binding while being inserted into the electronic device by the motor.

The error condition 1235 can be detected by a sensor, such as the positioning sensors described in conjunction with step 1215. The error condition 1235 can also be detected by a sensor, such as sensor 440 of FIG. 5. In FIG. 5, the block-side arm portion 210 is connected to a follower arm portion 220 via a linear clutch as shown in FIG. 12, FIG. 13A, and FIG. 13B. If the insertion of the plugs is blocked, jammed, or the insertion force exceeds a mechanical limit, the linear clutch can slip allowing the two arm portions to move independently. The sensor 440 can detect the slippage between the two arm portions and indicate the error condition to the dock controller. The mechanical limit can be set by the selection of materials in the linear clutch. In exemplary embodiments of the invention, the mechanical limit is approximately five to ten pounds. The exact mechanical limit is not critical—it is sufficient that the mechanical limit exceed the insertion force required to insert the plugs. Similarly, it is desirable that the mechanical limit is not so high that damage to the docking station or electronic device occurs in the event of an error condition.

If an error is detected at step 1240, the dock controller can reverse the motor and thus plug insertion 1245. Optionally, the dock controller can mechanically reset the slip clutch by running the motor in reverse to the maximum extent. The dock controller can indicate an error condition 1250 and transition to a "waiting" state 1205 for detecting a press of the "dock" button.

If an error condition is not detected at 1240, the docking controller can detect whether insertion of the plugs into the electronic device is complete 1255. The detection of a complete status can be determined by a sensor, such as sensor 430 of FIG. 2. Alternatively, the detection of a complete status can be detected by a spike in the current draw on the motor, or a voltage drop across the motor. If insertion is complete, the process can transition to an end state 1280.

If there is no error condition 1235, and insertion 1255 is not complete, the dock controller can detect a "cancel" signal 1265. A cancel signal can be generated by a user of the docking station when, for example, when the user decides that they no longer want to initiate docking. In this instance, insertion of the plugs 1230 can be aborted by pressing a cancel button 1265 or similar indicator. The cancel button can be an independent button from the "dock" button. In preferred embodiments of the invention, the "dock" button and the "cancel" button are the same button. During plug insertion 1230, the dock controller can interpret subsequent presses of the dock button as a "cancel" signal. If a cancel signal is not detected at 1270, the process can cycle back to checking for error conditions 1235. This cycle of checking for errors, completion, or a cancel signal continues. If the cancel button was pressed at step 1270, the dock controller can reverse plug insertion be reversing the motor and the process can end at a step 1280.

Figure 22B:
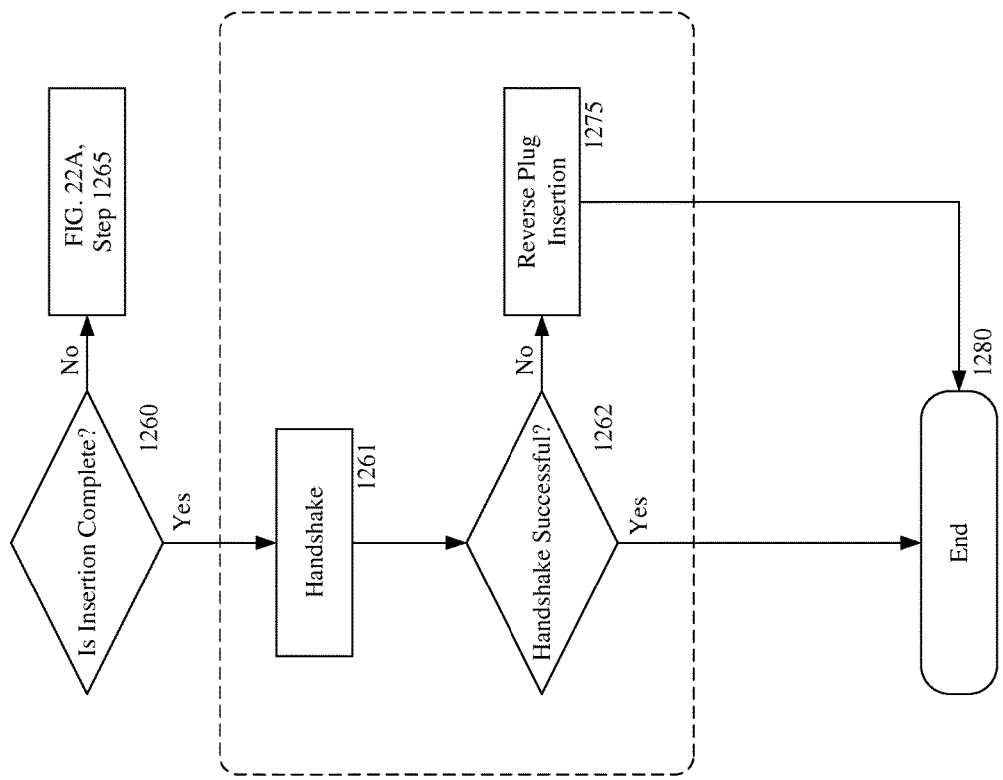
FIG. 22B is a flow chart for docking an electronic device including exemplary additional steps to FIG. 22A.

FIG. 22B is a flow chart for docking an electronic device including exemplary additional steps to FIG. 22A. The flow chart of FIG. 22B shows optional, additional, "handshake" step that can occur after the plugs have been successfully inserted according to FIG. 22A. As shown in FIG. 22B, if the plugs have been successfully inserted 1260 into the electronic device, the process can transition to the optional handshake step 1261. If the insertion 1260 was not successful, the process can transition to step 1265 of FIG. 22A. In the handshake step 1261, the docking station verifies that the computer being docking in the docking station is the computer that set the lock. The handshake 1261 can prevent an electronic device from becoming locked in the docking station where the owner of the electronic device is not authorized to remove the electronic device from the docking station.

In the handshake step 1261, the electronic device can send an identifier to the docking station. The identifier can be any information sufficient to identify an electronic device to the docking station. The identifier can be, for example, the MAC address of an Ethernet device in the electronic device. The identifier can be, for example, a serial number of a motherboard or other hardware device in the electronic device. In the case of an enterprise with many docking stations, the identifier can be an enterprise identifier that is shared between all electronic devices. Upon receiving the identifier, the docking station can compare the identifier to a stored identifier or list of stored identifiers. If there is a match, the docking station will know that the electronic device is "known" to the docking station and, presumably, the user of the electronic devices has the necessary credentials to subsequently undock the electronic device.

The handshake 1261 can ensure that an unknown device, such as a laptop computer of a guest or visitor, is not accidentally docked to a docking station in the locked state. Without such a handshake 1261, an electronic device could conceivably be docked to a "locked" docking station when the user or owner of the electronic device does not have credentials to unlock or undock the docking station. Similarly, if an electronic device does not have software installed to communicate with the docking station, it will not become locked in the docking station.

If at step 1262, the handshake is unsuccessful (indicated an unknown device) or there is a timeout (indicating the electronic device is off or does not have appropriate software), the process can transition to step 1275 wherein the docking station controller reverses the plug insertion thus freeing the electronic device from the docking station.

Figure 23:
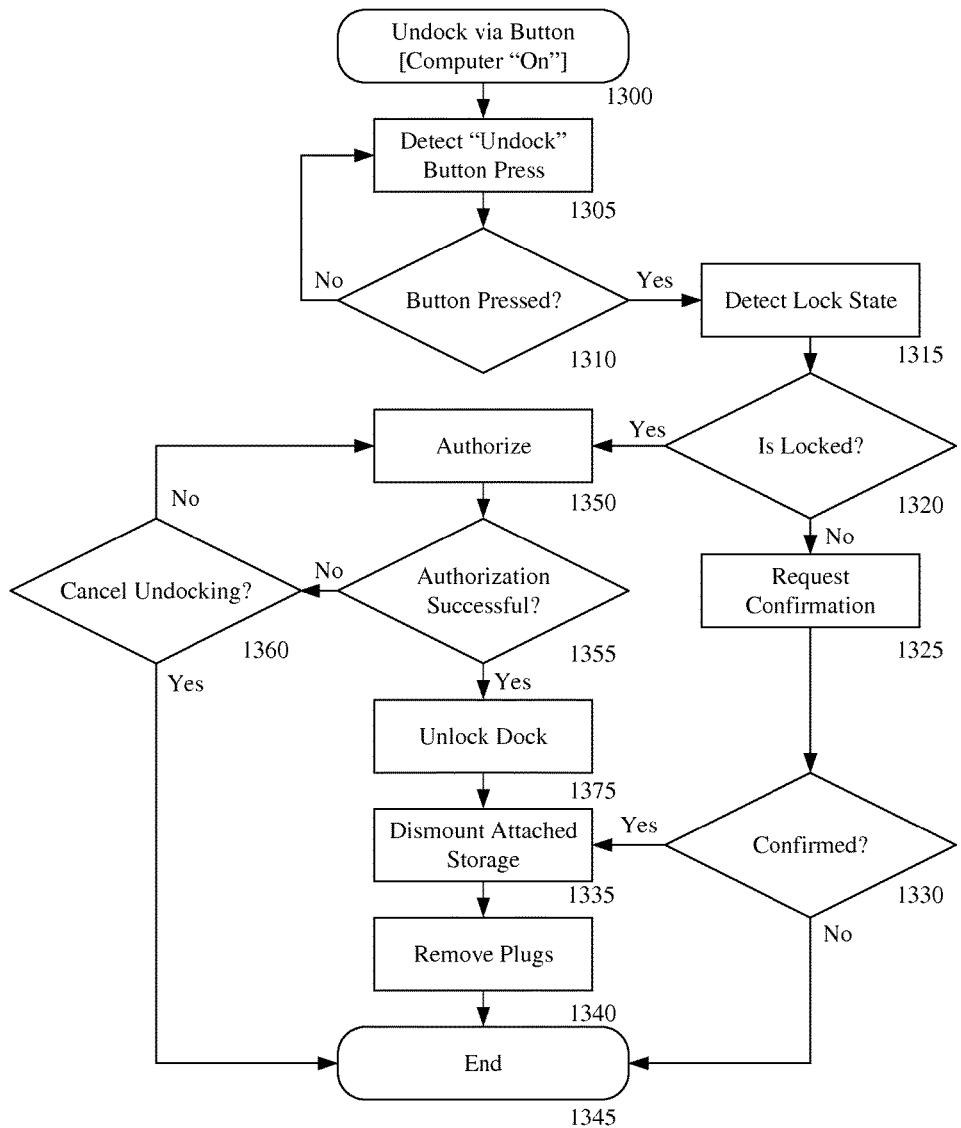
FIG. 23 is a flow chart of undocking according to an exemplary embodiment of the invention.

FIG. 23 is a flow chart of undocking according to an exemplary embodiment of the invention. The flow chart of FIG. 23 can be applicable when, for example, when a user presses an "undock" button on the docking station and the electronic device is in an "on" state. The "undock" button can be a separate and independent button from the "dock" button. In preferred embodiments of the invention, the "undock" button is the same as the "dock" button. When the dock is a "docked" state, the dock controller can interpret a signal from the "dock" button as signal to "undock". As shown in FIG. 23, undocking can begin 1300 by detecting 1305 a signal from the "undock" button on the docking station. If no "undock" signal is detected at step 1310, the docking station can continue to check 1305 for an "undock" signal. If an "undock" signal is detected 1310, for example, via pressing the undock button on the docking station, the docking station can next detect 1315 whether the docking station is in a "locked" state.

The purpose of the "locked" state is to prevent the removal of the electronic device from the docking station. In use, when an electronic device is docked, plugs enter the electronic device from both sides and secure the electronic device to the docking station. The electronic device can only be removed when the plugs are removed, thus freeing the electronic device. Accordingly, the electronic device can be secured in the docking station by preventing removal of the plugs (preventing undocking) when the docking station is in a "locked" state.

In preferred embodiments of the invention, the plugs are electrical plugs that electrically interface with the electronic device. In other embodiments, the plugs can be "dummy" plugs formed from nylon or other sturdy yet non-electrically conductive material. In embodiments utilizing dummy plugs, the plugs on one side of the docking station can be electrically functional plugs and plugs on the opposite side can be dummy plugs. Embodiments utilizing dummy plugs can save the cost of electrical components while still achieving the benefit of the locking capability.

The docking station can be set to a "locked" state by a user of the electronic device. The docking station can be set to a locked state, for example, by pressing and holding the "dock" button for five seconds. The docking station can be set to a locked state by a remote administrator. The "locked" state can be represented by setting a bit or a flag in the dock controller. Docking and undocking can be achieved by the motor and gears shown in FIG. 5. The motor can be controlled exclusively by the dock controller. When the docking station is in a "locked" state, the dock controller can ignore or reject messages or requests to undock the electronic device thus securing the electronic device in the docking station. The docking station can be physically attached to a large stationary object with a Kensington-style lock thus preventing removal of the docking station and electronic device together.

An electronic device locked in the docking station can also be protected against unauthorized access to data when a thief has physical access to the electronic device. For example, a common attack is to boot a password-protected electronic device from an external storage device to gain access to data stored on the hard drive of the electronic device. If, however, the electronic device is locked in the docking station, the ports on the left and right sides of the electronic device can be physically covered by the docking station thereby preventing attachment of an external storage device. Similarly, a thief could not physically access and remove an internal hard drive of the electronic device because doing so would require disassembly of the electronic device—a challenging task when the electronic device is locked in the docking station.

Detecting lock state 1315 can include checking whether the bit or flag indicates a locked state. At step 1320, if the docking station is not in a locked state, the undock process will transition to "request confirmation" step 1325. At step 1325, the dock controller can send a message to software running on the electronic device indicating that the "undock" button has been pressed. The software running on the electronic device can prompt a user of the electronic device to confirm 1330 that they desire to undock. If the user does not confirm, or a timeout condition occurs, the process can end at step 1345. If the user confirms at step 1330, the software running on the electronic device can cause attached storage devices to dismount and all caches and buffers be written to the attached disks. When the software running on the electronic device detects that the attached storages have been dismounted, the electronic device can send an "undock" message to the dock controller to remove the plugs 1340 from the electronic device. Upon receiving the "undock" message, the dock controller can activate the motor to remove the plugs from the electronic device. When the docking station detects that the plugs are completely removed, the process ends 1345.

In the event that the docking station is locked at step 1320, the dock controller can authorize removal of the electronic device. Authorization can be accomplished in many ways. For example, authorization can include sending a "request authorization" message from the dock controller to software running on the electronic device. Upon receiving the "request authorization" message, the electronic device can prompt the user to enter a password. In preferred embodiments of the invention, the password (or a password hash) is stored in memory on the docking station. Accordingly, authorization further includes sending a password entered by the user to the dock controller. The docking controller can subsequently compare the entered password to the stored password 1355 and, if the passwords match, set the docking station to an "unlocked" state 1375.

Authorization can also be provided by a hardware key connected to the docking station or electronic device. In this instance, when the electronic device receives the "request authorization" message from the docking station, the electronic device can check for the presence of the hardware key and, if the key is present, send a message to the docking station indicating authorization was successful 1355 and setting the docking station to an "unlocked" state 1375.

Authorization can also be provided by the presence of a cellular telephone. In common user scenarios, a user is likely to desire the electronic device to be secured against theft while the users is not present, but easy to remove while the user is present. The presence of a user can be determined, for example, if the user's cellular telephone can be detected by the electronic device. In this instance, when the electronic device receives the "request authorization" message from the docking station, the electronic device can check for a Bluetooth or WiFi signal emitted by the cellular telephone. If the cellular telephone is detected by the electronic device, the electronic device can send a message to the docking station indicating authorization was successful 1355 and setting the docking station to an "unlocked" state 1375.

In the alternative, the electronic device can use an electronic identifier of the cellular telephone as a password. The electronic identifier can be, for example, the MAC address of a wireless card, a serial number, or other electronic identifier of the cellular telephone. The electronic identifier can be used as a password. In embodiments of the invention, the cellular telephone can include an app that provides a password to the electronic device which in turn provides the password to the docking station to authorize unlocking or removal of the electronic device.

If authorization was not successful, the process can transition to decision step 1360 where authorization is retried or aborted. For example, if authorization is unsuccessful, a user can indicate "cancel" to abort undocking. If authorization has failed multiple times, the docking controller and/or electronic device can automatically abort undocking.

Figure 24:
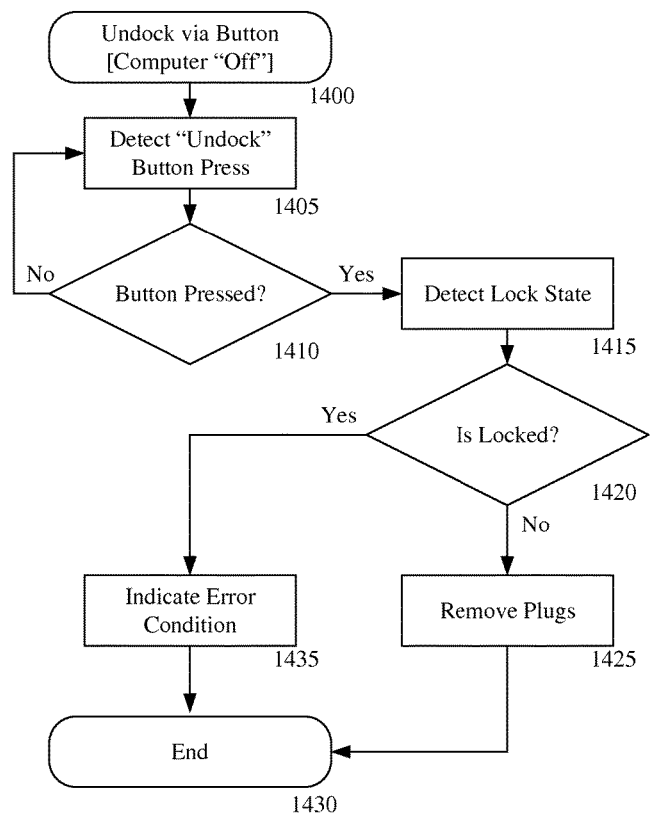
FIG. 24 is a flow chart of undocking according to an exemplary embodiment of the invention.

FIG. 24 is a flow chart of undocking according to an exemplary embodiment of the invention. The flow chart of FIG. 24 can be applicable when, for example, when a user presses an "undock" button on the docking station and the electronic device is in an "off" state. FIG. 24 represents a special use-case because, if the electronic device is "off", the electronic device cannot be used for authorization. As shown in FIG. 24, undocking an electronic device can begin 1400 by a user pressing an "undock" button 1405 on the docking station. If the button is pressed or docking is otherwise indicated, the process can transition to step 1415 where the dock controller determines whether the dock is in a "locked" state. At decision step 1420, if the dock is in a "locked" state, the dock indicates an error condition 1435 and the process ends 1430. Alternatively, if the docking station is not in a "locked" state, the dock controller can activate the motor to remove the plugs at step 1425 thus freeing the electronic device and ending the process 1430.

Figure 25:
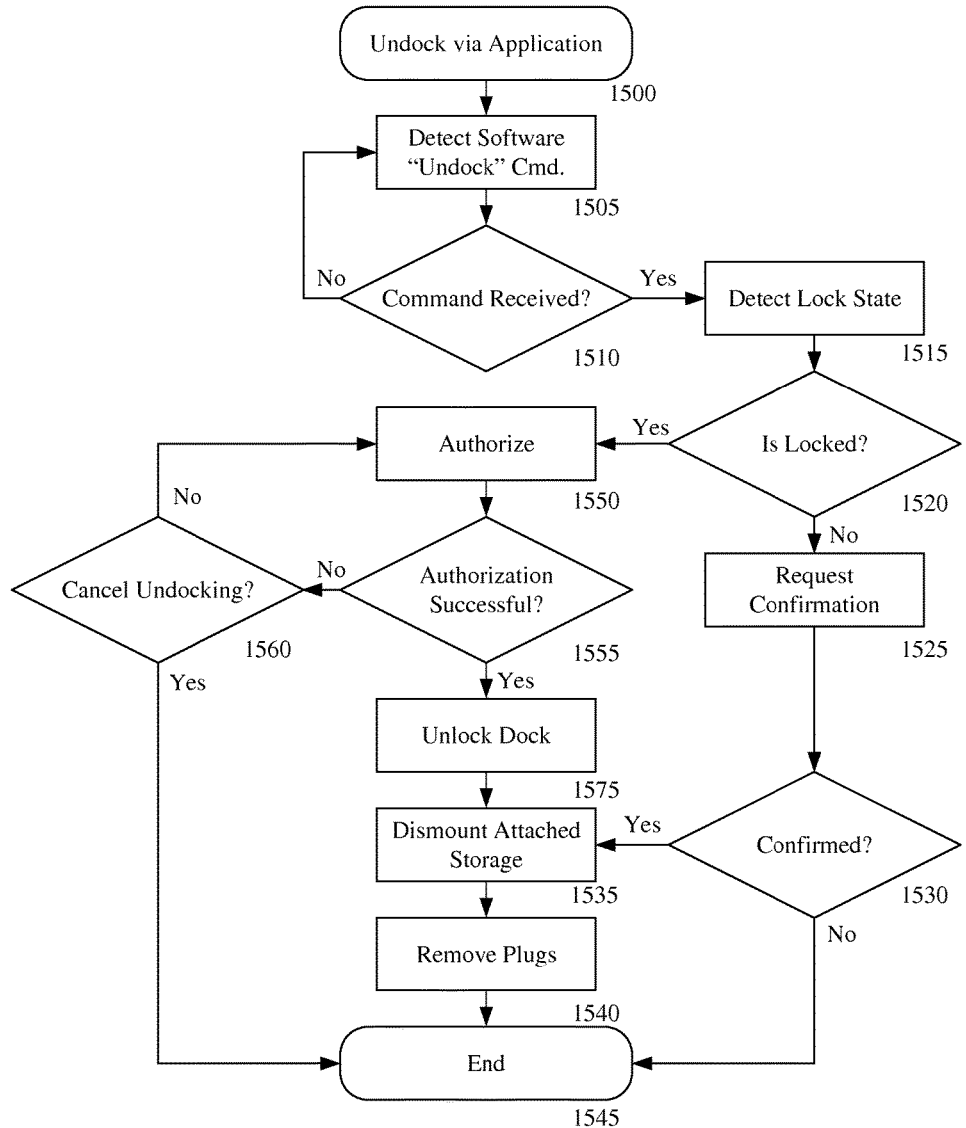
FIG. 25 is a flow chart of undocking according to an exemplary embodiment of the invention.

FIG. 25 is a flow chart of undocking according to an exemplary embodiment of the invention. The flow chart of FIG. 25 can be applicable when, for example, when a user initiates undocking from the electronic device. As shown in FIG. 25, undocking can start 1500 when an "undock" command is detected 1505 by software running on the electronic device. An undock command can be generated by many circumstances, for example, the software can have a button or menu item that generates an undock command or signal when selected. The software application can also recognize a hotkey or series of hot keys and, in response, generate the undock command, signal, or otherwise begin the undocking process 1505. When the undock command is detected, the process transitions to step 1515 where the software on the electronic device detects whether the dock is in a "locked" state. Detection of the dock state can be determined, for example, by sending a query to the dock controller. The dock controller in turn reads the "locked" bit or flag and returns the result to the software running on the electronic device. In the alternative, the "lock" state can be stored locally on the electronic device.

At decision step 1520, if the device is "unlocked", the electronic device can request confirmation 1525 from the user. Confirmation can be obtained, for example, by displaying a dialog to the user with two choices "confirm" or "cancel." If the user confirms, the software on the electronic device can dismount attached storage 1535 and when complete, send a message to the dock controller instructing the dock controller to remove 1540 the plugs from the electronic device thus completing the undocking 1545.

If, at decision step 1520, the docking station is in a locked state, the software running on the electronic device can authorize 1550 undocking according to the previously disclosed methods including password, hardware key, or cellular telephone detection. If authorization is successful, the electronic device can send a message to the dock controller instructing the dock controller to set the dock to an unlocked state 1575. The software on the electronic device can then dismount attached storage 1535 and when complete, send a message to the dock controller instructing the dock controller to remove 1540 the plugs from the electronic device thus completing the undocking 1545.

In preferred embodiments of the invention the docking station is maintained in the "locked" state even when undocking. In these cases, after successful authorization, the step of unlocking the dock 1575 can be skipped and the undocking process can proceed to dismounting 1535 and removing plugs 1540. This embodiment can be preferable in circumstances where a user desires the electronic device to be always locked when docked. There are also efficiencies to maintaining the dock in a locked state. For example, a user would not have to manually set the dock to a locked state.

When the dock is "open" and also "locked" an undesirable operating method is possible. For example, if a user inserts an electronic device that is not loaded with the appropriate software to communicate with the dock controller and the user presses the "dock" button, the device can become irretrievably locked in the docking station. There are multiple safety mechanisms to prevent such undesirable operational modes. For example, if the docking is initiated when the dock is already in a "locked" state, the dock controller can ignore the "lock" status and allow undocking. As a second safety mechanism, when docking is initiated and the dock is in a "locked" state, the docking controller can communicate with the electronic device when docking is complete. Successful communication can indicate that the electronic device is loaded with the appropriate software and thus unlocking and undocking is possible via software. If communication is unsuccessful, the dock can automatically "undock" or allow undocking notwithstanding the lock bit. As a third safety mechanism, the dock controller can detect a signal from the reset button 420 of FIG. 5 and set the dock to an unlocked state. As a fourth safety mechanism, a gear 350 of FIG. 5 can be turned with an allen wrench to manually open the docking station.

Figure 26:
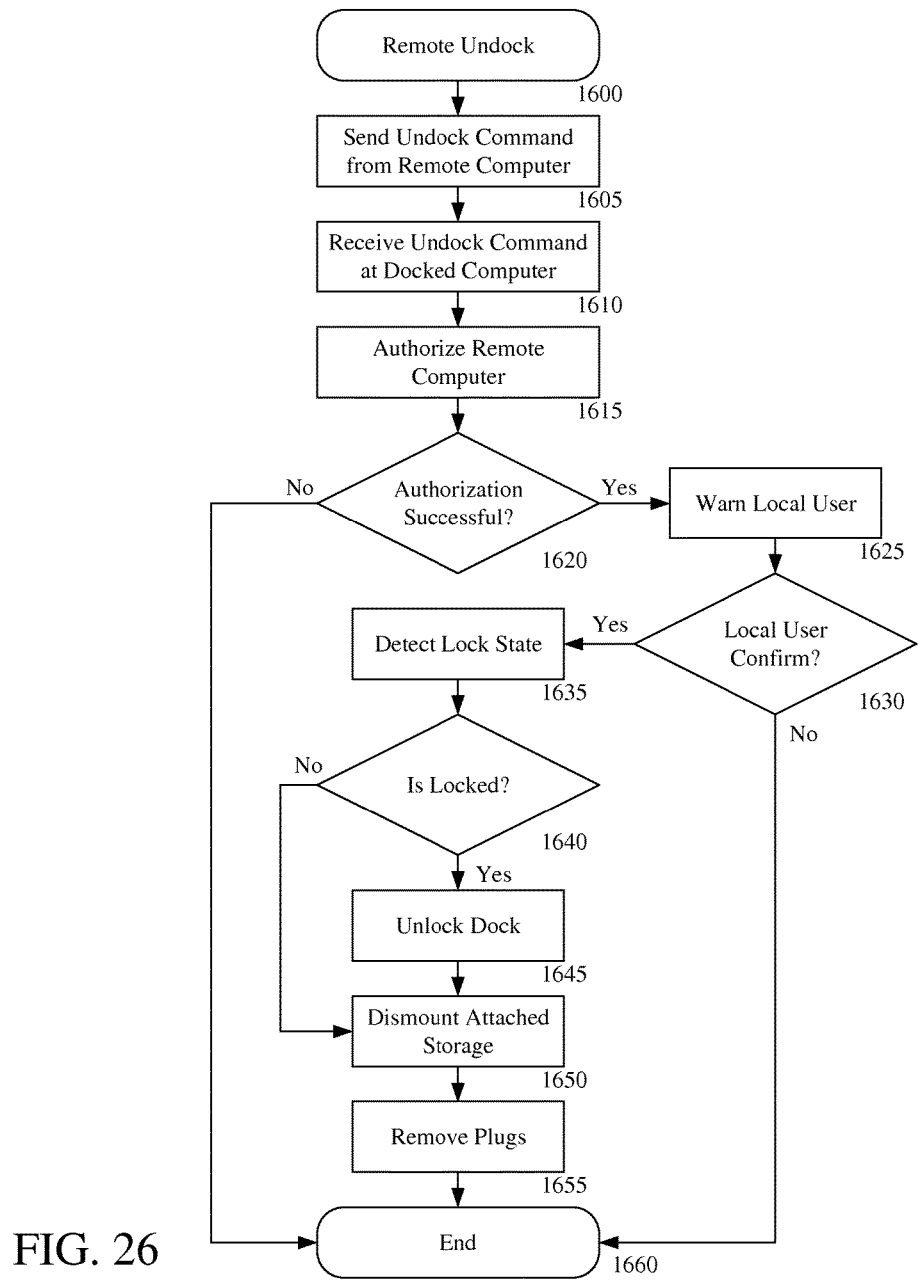
FIG. 26 is a flow chart of undocking according to an exemplary embodiment of the invention.

FIG. 26 is a flow chart of undocking according to an exemplary embodiment of the invention. The flow chart of FIG. 26 can be applicable when, for example, an undocking signal is received from a remote computer. A remote undock signal could be generated, for example, by an administrator of a computer lab that desires to remove all docked and locked laptops at once, such as for maintenance. In such a circumstance, a single undock command can be sent by a remote computer to the docking stations and attached electronic devices to initiate undocking simultaneously.

As shown in FIG. 26, remote undocking beings 1600 by sending an undock message from a remote computer 1605. The undock message can be received 1610 by software running on a docked electronic device. The undock message can include an instruction to initiate undocking and an authorization token, such as a password. The electronic device then authorizes 1615 the remote computer by analyzing the authorization token. In the example where the token is a password, the password can be compared against a password stored on the docking station or the electronic device. If authorization is successful, the software on the electronic device can optionally warn 1625 the local user that undocking is about to begin, ask the user to save work, and confirm to proceed. The undocking process can be aborted if the local user does not confirm. In the alternative, undocking can occur automatically (or be aborted) after the expiration of a predetermined time period, such as thirty seconds. The time period and an action to be performed at the expiration of the time period can be provided in the undock message. If the user confirms undocking at decision step 1630 or if a timeout was specified and a default action was set to "undock", then the process can proceed to a step 1635 where the lock state is detected. If the device is locked, the dock can optionally be unlocked at 1645. Next, external storage devices can be dismounted 1650 and the plugs of the docking station can be removed 1655 thereby completing the process 1660.

It is noted that the "unlock" step is optional and that undocking can be achieved while the docking station is in a locked state if authorization is successful. In such a circumstance, the docking station would be in an open or undocked state and "locked." Any subsequently docked electronic device would become locked in the docking station.

Just as a remote computer can initiate undocking, a remote computer can further initiate setting the docking stations to a locked state. For example, an authorized remote computer can send a "lock" message to a docked electronic device present on a network. The remote sending of a "lock" message could be desirable in the event of a building evacuation where a network administrator desires to secure electronic devices against theft during the chaos of a building evacuation. In embodiments of the invention, the docking software of the electronic device can receive a lock message from a remote administrator and in response, set the docking station to a locked state. When a docking station is remotely set to a locked state, the docking station can disable undocking for a predetermined period of time—even if a user is otherwise authorized to undock the electronic device.

In embodiments of the invention, the docking software can detect if the electronic device was removed from a docking station without providing valid credentials. Such a circumstance could indicate theft of the electronic device, such as by forcefully breaking the docking station or by manually rotating the gears to remove the plugs from the electronic device. In such a circumstance, the electronic device can perform a set of actions that can be predetermined by an administrator of the electronic device. For example, the docking station software can call a script or program generated by an administrator of the electronic device that automatically encrypts or deletes sensitive user data. The script can delete cached passwords and internet browsing history. The script can activate a geolocation device such as GPS or WiFi and transmit the location of the electronic device back to the administrator. The script can activate a camera on the electronic device and periodically take photographs and transmit the photographs back to an administrator of the electronic device.

Figure 27:
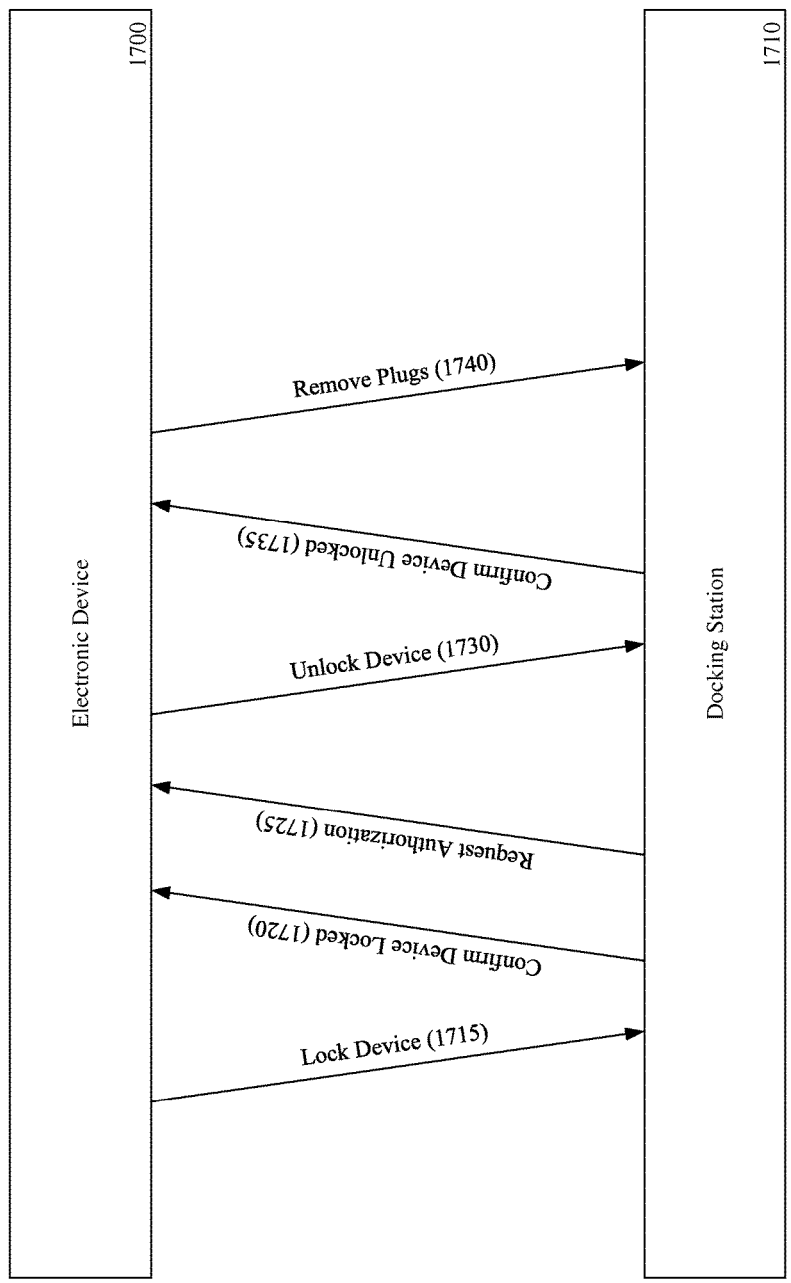
FIG. 27 is an exemplary call flow between a dock controller of a docking station and a docked electronic device.

FIG. 27 is an exemplary call flow between a dock controller of a docking station and a docked electronic device. As shown in FIG. 27, an exemplary call flow between an electronic device 1700 and a dock controller of a docking station 1710 can begin with a lock message 1715 to lock the docking station. The lock message can be sent from the electronic device 1700 to the docking station 1710. The lock message can include an instruction to set the docking station to a locked state. The lock message can optionally include an authorization token such a password that can later be used to unlock the docking station. After receiving the lock message 1715, the docking station can respond with a confirmation message 1720 that confirms to the electronic device that the docking station is now in a locked state. The electronic device can optionally store the lock status of the docking station to avoid unnecessarily requesting lock status from the docking station.

In the exemplary call flow, a user presses an "undock" button on the docking station 1710 causing the docking station 1710 to send a "request authorization" message 1725 to the electronic device 1700. When the request authorization message 1725 is received the docking station can perform one of the aforementioned authorization methods to determine whether undocking is authorized. If undocking is authorized, the electronic device 1700 can send an unlock message 1730 to the docking station 1710. The unlock message 1730 can include an instruction to set the docking station 1710 to an unlocked state. The unlock message 1730 can include an authorization token such as a password. Upon receiving the unlock message 1730, the docking dock can compare a previously stored authorization token to the authorization token provided in the unlock message 1730 and, if the tokens match, set the docking station 1710 to an unlocked state.

When the docking station 1710 is set to an unlocked state, the docking station 1710 can send an unlock confirmation message 1735 to the electronic device. If, however, the docking station 1710 was not set to an unlocked state (i.e. authorization failed), the docking station can send an authorization failure message (not shown) to the electronic device 1700. Upon receiving the unlock confirmation message 1735, the electronic device 1700 can begin dismounting attached storage devices. When dismounting is complete, the electronic device 1700 can send a "remove plugs" or "undock" message 1740 to the docking station 1710. Upon receiving the undock message 1740, the docking station can activate a motor contained therein to drive the gears thus removing the plugs from the electronic device 1700.

Figure 28:
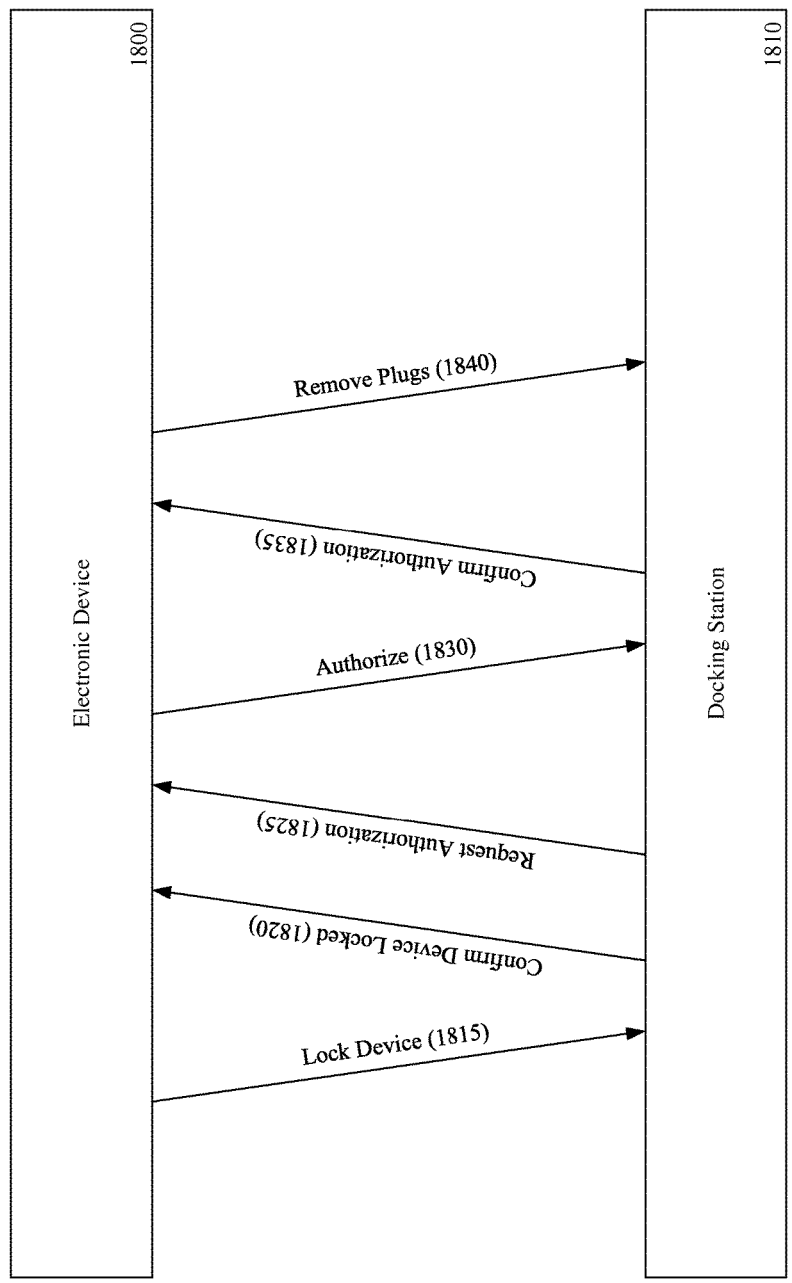
FIG. 28 is an exemplary call flow between a dock controller of a docking station and a docked electronic device wherein the docking station remains in a "locked state" after undocking.

FIG. 28 is an exemplary call flow between a dock controller of a docking station and a docked electronic device wherein the docking station remains in a "locked state" after undocking. As shown in FIG. 28, an exemplary call flow between an electronic device 1800 and a dock controller of a docking station 1810 can begin with a lock message 1815 to lock the docking station. The lock message 1815 can be sent from the electronic device 1800 to the docking station 1810. The lock message 1815 can include an instruction to set the docking station to a locked state. The lock message can optionally include an authorization token such a password that can later be used to unlock the docking station 1810. After receiving the lock message 1815, the docking station 1810 can respond with a confirmation message 1820 that confirms to the electronic device 1800 that the docking station 1810 is now in a locked state.

In the exemplary call flow, a user presses an "undock" button on the docking station 1810 causing the docking station 1810 to send a "request authorization" message 1825 to the electronic device 1800. When the request authorization message 1825 is received, the docking station can perform one of the aforementioned authorization methods to determine whether undocking is authorized. In the case of password authorization, the electronic device can prompt a user to enter a password. Upon entering the password, the electronic device 1800 can "check" the password by sending an "authorize" message 1830 to the docking station 1810. The authorize message 1830 can include an authorization token, such as the password. At the docking station 1810, if the password matches the stored password, the dock can respond with an authorization confirmation message 1835 that indicates to the electronic device 1800 that the authorization was successful (or not). If the authorization confirmation message 1835 indicates that authorization was successful, the electronic device can now dismount attached storage devices and, when complete, send a "remove plugs" or "undock" message 1840 to the docking station 1810. In this exemplary call flow, because the device was not unlocked, the undock message 1840 can also include the authorization token password.

Figure 29:
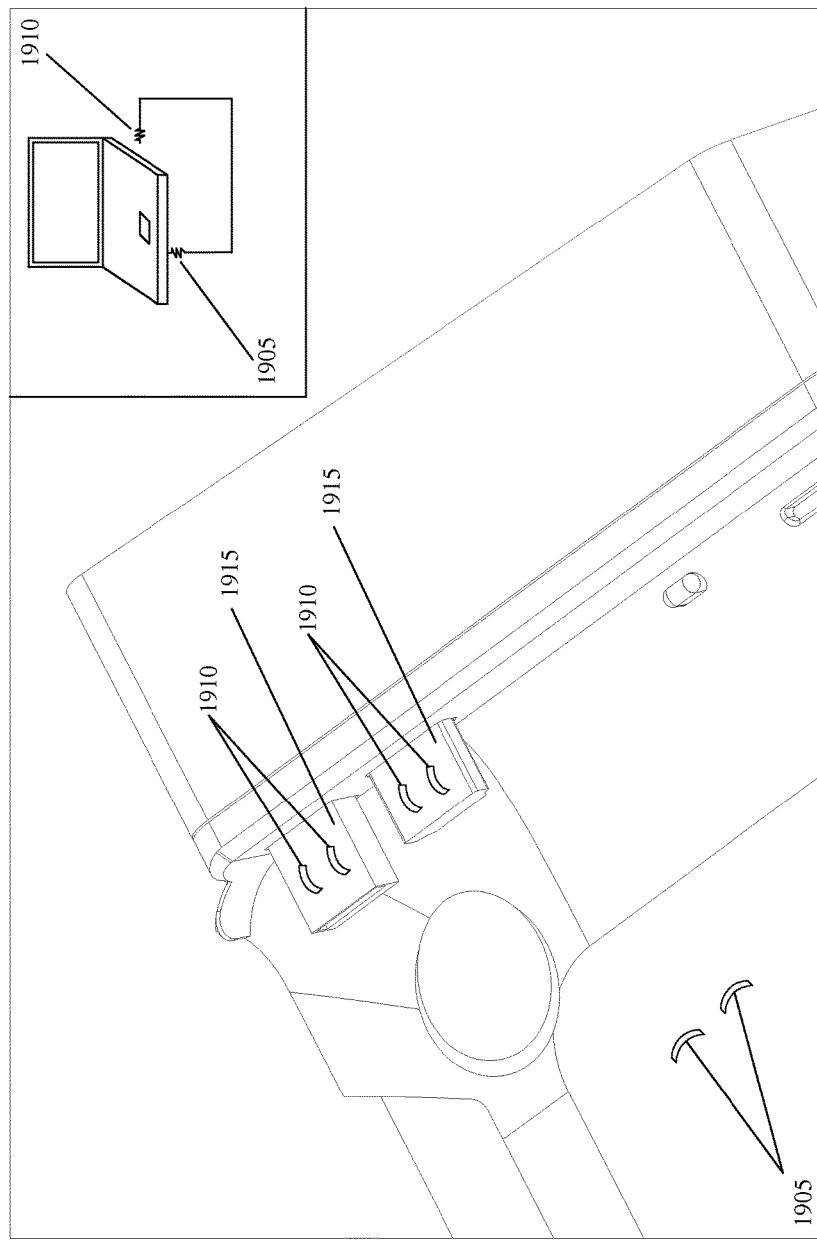
FIG. 29 is a perspective view of a port misalignment detection mechanism according to an exemplary embodiment of the invention.

FIG. 29 is a perspective view of a port misalignment detection mechanism according to an exemplary embodiment of the invention. As shown in FIG. 29, a port misalignment detection mechanism includes electrical contacts 1905 and 1910 and one or more plugs 1915. The electrical contacts 1905 can be located on a tray portion of the docking station and be positioned such the electrical contacts 1905 touch a chassis of an electronic device inserted into the docking station. The electrical contacts 1910 can be located on one or more plugs 1915.

The electrical contacts 1910 can be positioned such that when the plugs 1915 are inserted into the electronic device in a misaligned orientation, the electrical contacts 1910 contact the chassis of the electronic device. The electrical contacts 1910 can be positioned on the plugs 1915 such that when the electronic device is properly aligned in the docking station and the plugs 1915 are inserted into the electronic device, that the electrical contacts 1910 do not contact the chassis of the electronic device.

Together, electrical contacts 1905 and 1910 can detect a misalignment of the electronic device in the docking station when the chassis of the electronic device is formed from an electrically conductive material such as aluminum. For example, the electrical contacts 1905 and 1910 can be part of an electrical circuit (see simplified circuit diagram inset on FIG. 13.) If both electrical contacts 1905 and 1910 contact the conductive chassis of the electronic device, the circuit can be completed indicating that the plugs of the docking station may be misaligned with the corresponding ports of the electronic device.

In alternative embodiments, the electrical contacts 1910 can be omitted and instead the metal portion of the plug 1915 can be used as an electrical contact. If the electronic device is misaligned in the docking station, the one or more plugs 1915 can contact a chassis portion of the electronic device thus completing the circuit between the electrical contact 1905 and the metal housing of the plugs 1915. If a misalignment is detected the dock controller can indicate an error condition and reverse the insertion of the plugs 1915.

It will be apparent to those skilled in the art that various modifications and variations can be made in the motorized horizontal docking station having integrated locking mechanism without departing from the spirit or scope of the invention. Thus, it is intended that embodiments of the invention cover the modifications and variations of this invention provided they come within the scope of the appended claims and their equivalents.

What is claimed is:

1. A method for detecting misalignment between a plurality of plugs in a motorized docking station and a corresponding plurality of ports on an electronic device, the method comprising:

applying an electrical charge to a motor, the motor connected to a drive train and the drive train connected to the plurality of plugs of the motorized docking station, the plurality of plugs disposed in relative positions to interface with the corresponding plurality of ports on the electronic device;

monitoring by a sensor an electrical property of the electrical charge to detect the misalignment between the plurality of plugs in the motorized docking station; and removing by a processor the electrical charge from the motor if the electrical property exceeds a predetermined threshold;

wherein the processor is further configured to apply a reverse electrical charge to the motor when the electrical property exceeds the predetermined threshold.

2. The method of claim 1 wherein the electrical charge is a positive DC voltage.

3. The method of claim 1 wherein the electrical property is an electrical current.

4. The method of claim 3 wherein the wherein the predetermined threshold is measured in terms of a current increase.

5. The method of claim 3 wherein the wherein the predetermined threshold is an absolute current.

6. The method of claim 1 wherein the electrical property is a voltage.

7. The method of claim 6 wherein the predetermined threshold is measured in terms of a voltage drop.

8. The method of claim 6 wherein the predetermined threshold is an absolute voltage.

9. The method of claim 1 further comprising:
wherein the electrical charge is a positive DC voltage;
wherein the reverse electrical charge is a negative DC voltage;
wherein the electrical property is an electrical current; and wherein the predetermined threshold is an absolute current.

10. A device for detecting misalignment between a plurality of plugs a motorized docking station and a corresponding plurality of ports on an electronic device, the device comprising:
a motor connected to a drive train and the plurality of plugs of the motorized docking station, the plurality of plugs disposed in relative positions to interface with the corresponding plurality of ports on the electronic device;
a sensor configured to detect an electrical property of an electrical charge applied to detect the misalignment between the plurality of plugs in the motorized docking station; and
a processor configured to remove the electrical charge from the motor when the electrical property exceeds a predetermined threshold;
wherein the processor is further configured to apply a reverse electrical charge to the motor when the electrical property exceeds the predetermined threshold.

11. The device of claim 10 wherein the electrical charge is a positive DC voltage.

12. The device of claim 10 wherein the electrical property is a current.

13. The device of claim 12 wherein the predetermined threshold is an absolute current.

14. The device of claim 10 wherein the electrical property is a voltage.

15. The device of claim 14 wherein the predetermined threshold is an absolute voltage.

16. The device of claim 14 wherein the predetermined threshold is a voltage drop.

17. A device for detecting misalignment between a plurality of plugs in a motorized docking station and a corresponding plurality of ports on an electronic device, the device comprising:
a motor connected to a drive train and the plurality of plugs of the motorized docking station, the plurality of plugs disposed in relative positions to interface with the corresponding plurality of ports on the electronic device;
a sensor configured to detect an current of an electrical charge applied to detect the misalignment between the plurality of plugs in the motorized docking station; and
a processor configured to remove the electrical charge from the motor when the current exceeds a predetermined absolute threshold current;
wherein the processor is further configured to apply a reverse electrical charge to the motor when the electrical property exceeds the predetermined threshold.

* * * * *